(12) United States Patent
Willey

(10) Patent No.: US 7,676,249 B2
(45) Date of Patent: Mar. 9, 2010

(54) ALERT METHODS AND APPARATUS FOR CALL APPOINTMENTS IN A CALENDAR APPLICATION BASED ON COMMUNICATION CONDITIONS OF A MOBILE STATION

(75) Inventor: William Daniel Willey, San Francisco, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 447 days.

(21) Appl. No.: 11/566,821

(22) Filed: Dec. 5, 2006

(65) Prior Publication Data

US 2008/0132221 A1    Jun. 5, 2008

(51) Int. Cl.
H04B 1/38     (2006.01)
H04M 11/00    (2006.01)
H04M 3/42     (2006.01)
H04W 68/00    (2009.01)

(52) U.S. Cl. .................... 455/567; 455/421; 455/414.1; 455/460

(58) Field of Classification Search ............ 371/202.01; 705/1; 455/567, 574
See application file for complete search history.

(56) References Cited

U.S. PATENT DOCUMENTS

| 5,794,146 | A  | 8/1998  | Sevcik et al. |
| 5,999,811 | A  | 12/1999 | Moelne et al. |
| 6,807,163 | B1 | 10/2004 | Shi |
| 6,826,414 | B1 | 11/2004 | Reynolds et al. |
| 7,084,758 | B1 | 8/2006  | Cole |
| 2002/0147012 | A1 | 10/2002 | Leung et al. |
| 2004/0018830 | A1 | 1/2004  | Pugliese |
| 2004/0120278 | A1 | 6/2004  | Krantz et al. |
| 2004/0266491 | A1 | 12/2004 | Howard et al. |

(Continued)

FOREIGN PATENT DOCUMENTS

EP      1298895 A2    4/2003

(Continued)

OTHER PUBLICATIONS

EPO Search Report, Sep. 5, 2008, Application No. 07122311.9.

(Continued)

*Primary Examiner*—Rafael Pérez-Gutiérrez
*Assistant Examiner*—Nalin Pilapitiya
(74) *Attorney, Agent, or Firm*—John J. Oskorep, Esq.

(57) ABSTRACT

Alert methods and apparatus for call appointments in a calendar application based on communication conditions of a mobile station are disclosed. Calendar information for an appointment in the calendar application is received and stored in memory. The calendar information is associated with a date and time of the appointment. In response to identifying an out-of-coverage condition of the mobile communication device within a predetermined time period of the date and time of the appointment, a warning indication is produced at a user interface of the mobile communication device. The warning indication may be or include a message which instructs a user of the mobile communication device to relocate the mobile communication device for removing the out-of-coverage condition, and may also include an audible or vibrating alert. The warning indication may be provided only if a telephone number or other suitable call information is identified within the calendar information.

21 Claims, 22 Drawing Sheets

U.S. PATENT DOCUMENTS

| | | | |
|---|---|---|---|
| 2005/0018827 A1* | 1/2005 | Himmel et al. | 379/202.01 |
| 2005/0261037 A1* | 11/2005 | Raghunath et al. | 455/574 |
| 2006/0217991 A1* | 9/2006 | Blake et al. | 705/1 |
| 2006/0240877 A1* | 10/2006 | Filiba et al. | 455/567 |

FOREIGN PATENT DOCUMENTS

| | | |
|---|---|---|
| EP | 1672882 A1 | 6/2006 |
| EP | 1641218 A1 | 3/2007 |
| EP | 1463366 A2 | 9/2008 |
| GB | 2339998 A | 9/2000 |
| JP | 10004585 | 1/1998 |
| JP | 10336737 | 12/1998 |
| JP | 2001268616 | 9/2001 |
| JP | 2002186051 | 6/2006 |
| WO | 0147290 A2 | 6/2001 |
| WO | 0195660 A1 | 12/2001 |
| WO | 2005104512 A | 11/2005 |
| WO | 2005104512 A1 | 11/2005 |

OTHER PUBLICATIONS

Extended European Search Report for EP application # 06125466.0, Dated Jul. 11, 2007.

* cited by examiner

FIG. 1
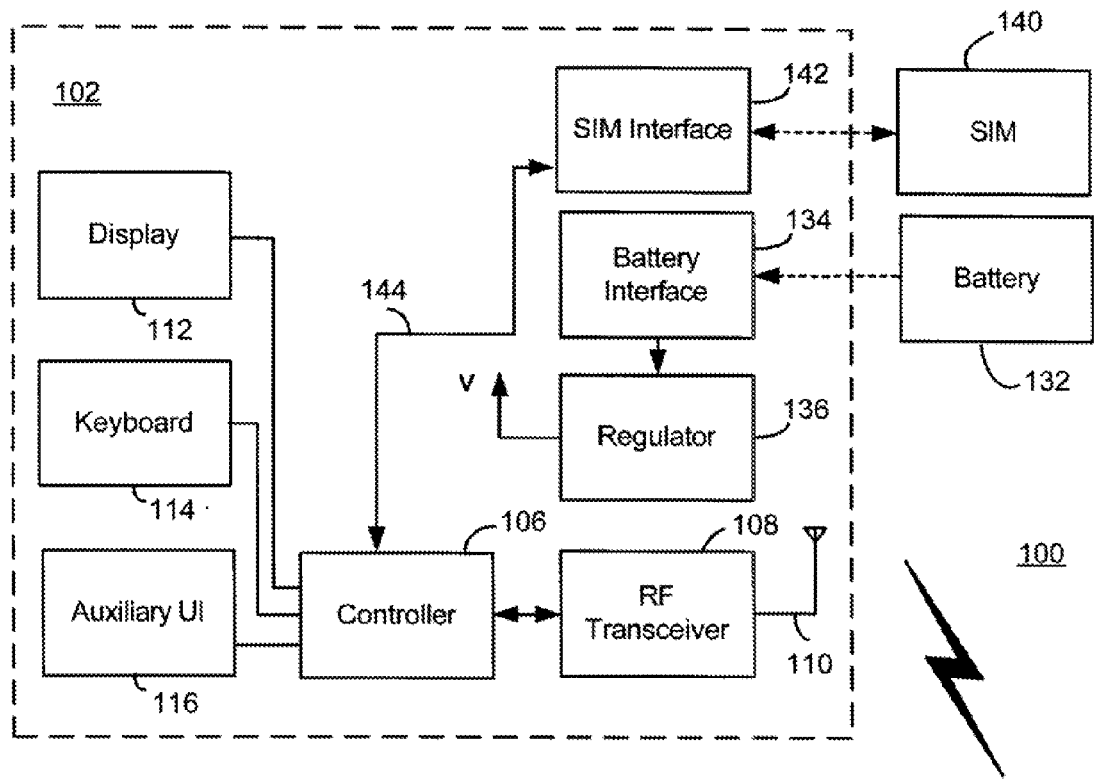
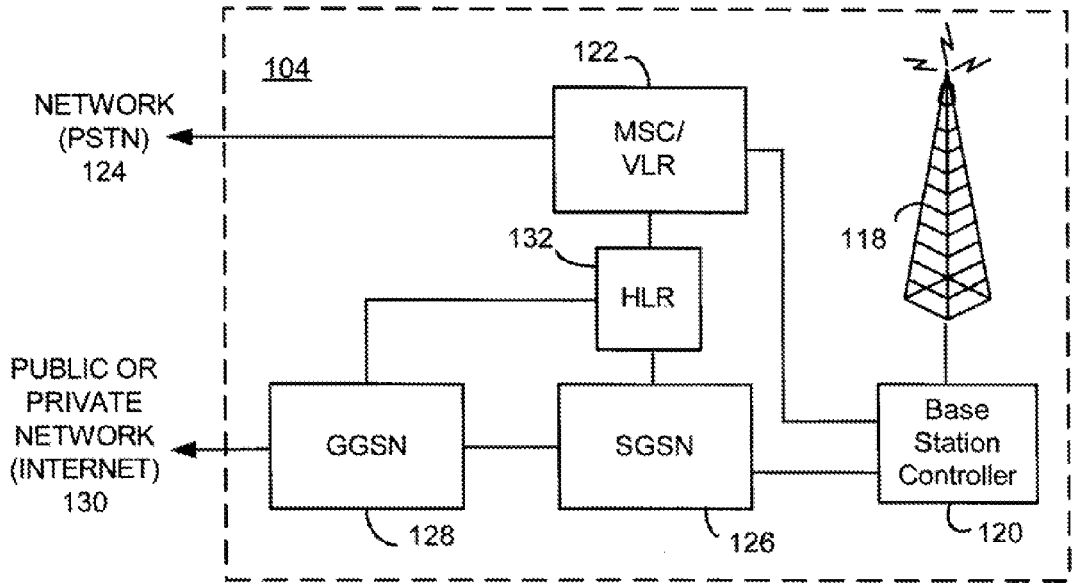

ALERT METHODS AND APPARATUS FOR CALL APPOINTMENTS IN A CALENDAR APPLICATION BASED ON COMMUNICATION CONDITIONS OF A MOBILE STATION

BACKGROUND

1. Field of the Technology

The present disclosure relates generally to mobile stations which operate in wireless communication networks, and more particularly to alert methods and apparatus for call appointments in a calendar application based on communication conditions of a mobile station.

2. Description of the Related Art

Mobile communication devices, such as cellular telephones or mobile electronic mail (e-mail) devices, sometimes experience poor or no service under certain degraded radio frequency (RF) coverage conditions. In these conditions, a user of the mobile device may be unaware of the poor or no service and unwittingly attempt to initiate a voice call from the mobile device. In this situation, the voice call request will be denied. The user may not immediately be aware when service has been restored and, in some cases, the user may forget to reattempt the voice call even when service has been restored.

A related problem is associated with pre-established calendar appointments made via a calendar application of the mobile device. Such calendar appointments are stored in memory of the mobile device and are typically associated with calendar information which includes a date, time, and/or time period of the appointment. The calendar information of the calendar application may be automatically synchronized with a corresponding calendar application on a computer (e.g. a PC) of a local area network (LAN) via the wireless communication network. The calendar appointment may or may not be for an anticipated scheduled voice call (e.g. a conference call) utilizing the mobile device. If the calendar appointment is for such a scheduled call, wireless coverage is required for the mobile device. That is, at the date and time of the appointment, the mobile device must be located within RF coverage range of the wireless communication network to make or receive the call for the appointment. If not, the user may miss or be late for the scheduled call. Note that the user may not be aware of any RF coverage problem until the calendar application reminds the user of the appointment, at or near the date and time of the appointment.

A further problem is associated with scanning operations of a mobile device when voice calls are anticipated based on calendar appointments or call reminders. If a calendar appointment is for a scheduled call, then wireless coverage is required for the mobile device. That is, at the date and time of the appointment, the mobile device must be located within RF coverage range of the wireless communication network to make or receive the call for the appointment. If not, the user may miss or be late for the scheduled call. When the mobile device initially goes out-of-coverage, the mobile device performs scanning operations at a relatively fast scan rate in attempt to identify any available wireless networks within RF coverage range. Over time, however, when no networks are found, the scan rate is decreased to a relatively slow scan rate. This is done in order to reduce power consumption of the mobile device, as scanning operations consume a significant amount of battery power. Currently, however, scanning operations and scan rates are functionally disconnected from stored calendar appointments which may be for voice calls or otherwise require wireless service for the mobile device.

Accordingly, it would be advantageous to provide techniques to facilitate anticipated voice calls for convenience and ease-of-use so as to overcome the deficiencies in the prior art.

BRIEF DESCRIPTION OF THE DRAWINGS

Embodiments of present disclosure will now be described by way of example with reference to attached figures, wherein:

FIG. 1 is a block diagram which illustrates pertinent components of a mobile station and a wireless communication network;

DETAILED DESCRIPTION OF THE PREFERRED EMBODIMENTS

Figure 2:
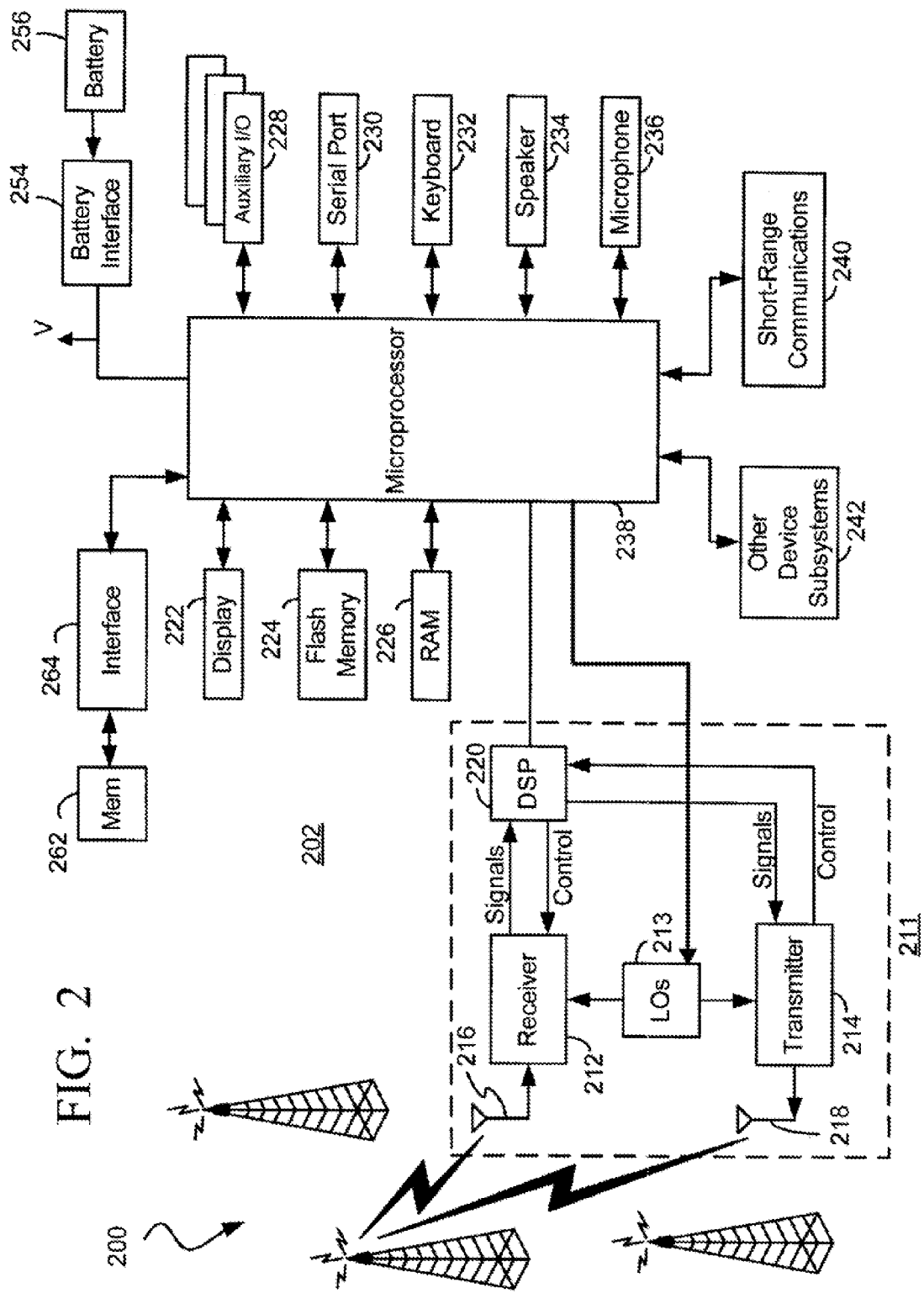
FIG. 2 is a more detailed diagram of a preferred mobile station of FIG. 1.

User interface methods and apparatus for processing voice call requests based on communication conditions of a mobile communication device are described herein. The mobile communication device of the present disclosure includes one or more processors, a wireless transceiver coupled to the one or more processors, and a user interface which includes a visual display. In one illustrative embodiment, a voice call request for a voice call is received through the user interface. If the voice call request is received during an out-of-coverage condition of the mobile communication device, the processor causes a call denial indication to be displayed in the visual display, which indicates that the voice call request could not be completed. The processor also causes a call reminder setup prompt to be displayed, which may be accepted or declined through the user interface. If an acceptance of the call reminder setup prompt is received, the processor causes a call reminder prompt for reattempting the voice call request to be displayed when an in-coverage condition of the mobile communication device is subsequently identified. The call reminder prompt, which may be accepted or declined through the user interface, reveals various call information regarding the previous voice call request such as the telephone number, name, and time of the previous request. If the call reminder prompt is accepted, the processor causes a voice call associated with the voice call request to be initiated. Additional call reminder techniques are disclosed to provide an even more flexible and easy-to-use interface.

In addition, alert methods and apparatus for call appointments in a calendar application based on communication conditions of a mobile station are described herein. Calendar information for an appointment in the calendar application of the mobile communication device is received and stored in memory. The calendar information is associated with a date and time of the appointment. In response to identifying an out-of-coverage condition of the mobile communication device within a predetermined time period of the date and time of the appointment, a warning indication is produced at a user interface of the mobile communication device. The warning indication may be or include a message which instructs a user of the mobile communication device to relocate the mobile communication device for removing the out-of-coverage condition, and may also include an audible or vibrating alert. The warning indication may be provided only if a telephone number or other suitable call information is identified within the calendar information.

Finally, methods and apparatus for use in controlling scanning operations or a scan rate based on call appointments or reminders are described herein. In one illustrative example, one or more processors of a mobile communication device may be operative to identify whether a call appointment or reminder for a communication session to be established during a current time period is stored in the memory, and determine a scan rate for scanning operations of the wireless transceiver which varies based on whether the call appointment or reminder for the communication session to be established during the current time period is identified. If the call appointment or reminder for the communication session to be established during the current time period is identified, for example, then the scan rate may be determined to be a first scan rate; otherwise the scan rate may be determined to be a second scan rate that is less than the first rate. The scan rate may further be determined to vary based on a duration of time over which repeated scanning operations fail to identify a suitable wireless communication network for communication (e.g. as the duration of time increases, the scan rate decreases). More generally, then, scanning operations and/or the scan rate of the present disclosure is determined based on different items which include any stored upcoming appointments requiring wireless service, previous call attempts or call reminders, as well as the time period over which scanning has been unsuccessful. In a simpler embodiment, a scanning operation is triggered based on identifying an imminent appointment or reminder regardless of the existing scan rate which is otherwise left unchanged. Advantageously, the scanning procedure is performed so as to reduce power consumption in the mobile communication device without compromising calling ability.

To illustrate basic system architecture, FIG. 1 is a block diagram of a communication system 100 which includes a mobile station 102 which communicates through a wireless communication network 104. When mobile station 102 is within coverage area provided by wireless communication network 104 or a similar wireless communication network, and is capable of sufficiently transmitting and/or receiving radio frequency (RF) signals for communications with the wireless communications network, such an operating condition is described in this application as an in-coverage condition. When mobile station 102 is outside of coverage area provided by wireless communication network 104 or a similar wireless communication network, and/or is incapable of sufficiently transmitting and/or receiving radio frequency (RF) signals for communications with the wireless communications network such an operating condition is described in this application as an out-of-coverage condition. Areas considered outside of a coverage area provided by a wireless communication network include locations beyond a geographical coverage area defined by RF radiation patterns from the wireless communication network antennae as well as locations within the geographical coverage area where an RF signal from a wireless communication network may be weak or nonexistent due to physical obstructions, interference from another energy source, or other conditions that may reduce RF signal strength.

In the embodiment of FIG. 1, wireless communication network 104 is configured in accordance with General Packet Radio Service (GPRS) and a Global Systems for Mobile (GSM) technologies; however, any suitable type of network communication protocols may be utilized. For example, the network may be based on code division multiple access (CDMA) or other suitable technologies. As another example, the network may be based on an Integrated Dispatch Enhanced Network (iDEN) which is a high-capacity digital trunked radio system providing integrated voice and data services.

Mobile station 102, which is one type of mobile communication device, preferably includes a visual display 112, a keyboard 114, and perhaps one or more auxiliary user interfaces (UI) 116, each of which are coupled to a controller 106. Controller 106 is also coupled to RF transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to wireless communication network 104, a telephone number to place a telephone call, commands to be executed on mobile station 102, and possibly other or different user inputs.

Mobile station 102 sends communication signals to and receives communication signals from wireless communication network 104 over a wireless link via antenna 110. RF transceiver circuitry 108 performs functions similar to those of station 118 and base station controller 120, including for example modulation/demodulation and possibly encoding/decoding and encryption/decryption. It is also contemplated that RF transceiver circuitry 108 may perform certain functions in addition to those performed by base station controller 120. It will be apparent to those skilled in art that RF transceiver circuitry 108 will be adapted to particular wireless communication network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify a user (or subscriber) of mobile station 102 and to personalize the device, among other things. Without SIM 140, the mobile station terminal is not fully operational for communication through wireless communication network 104. By inserting SIM 140 into mobile station 102, a user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless communication network 104 is configured in accordance with General Packet Radio Service (GPRS) and a Global Systems for Mobile (GSM) technologies. Wireless communication network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a transceiver station, and station 118 and BSC 120 are together referred to herein as the transceiver equipment. This fixed transceiver equipment provides wireless communication network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless communication network 104 and mobile station 102. Those skilled in art will appreciate that a wireless communication network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the fixed transceiver equipment instructing mobile station 102 to select a particular cell. Mobile station 102 informs wireless communication network 104 when it reselects another cell or group of cells, known as a routing area.

In order to access GPRS services, mobile station 102 first makes its presence known to wireless communication network 104 by performing what is known as a GPRS "attach". This operation establishes a logical link between mobile station 102 and SGSN 126 and makes mobile station 102 available to receive, for example, pages via SGSN, notifications of incoming data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. This also includes the software for executing the techniques of the present disclosure. A preferred application which is loaded onto mobile station 202 may be a personal information manager (PIM) application having the ability to organize and manage data items relating to e-mail messages and voicemail messages, as well as calendar data. Naturally, one or more memory stores are available on mobile station 202 and SIM 262 to facilitate storage of PIM data items and other information.

The PIM application preferably has the ability to send and receive data items via the wireless communication network. PIM data items may be seamlessly integrated, synchronized, and updated via the wireless communication network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238.

In a data communication mode, a received signal such as a text message (e.g. a short message service or SMS message), an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
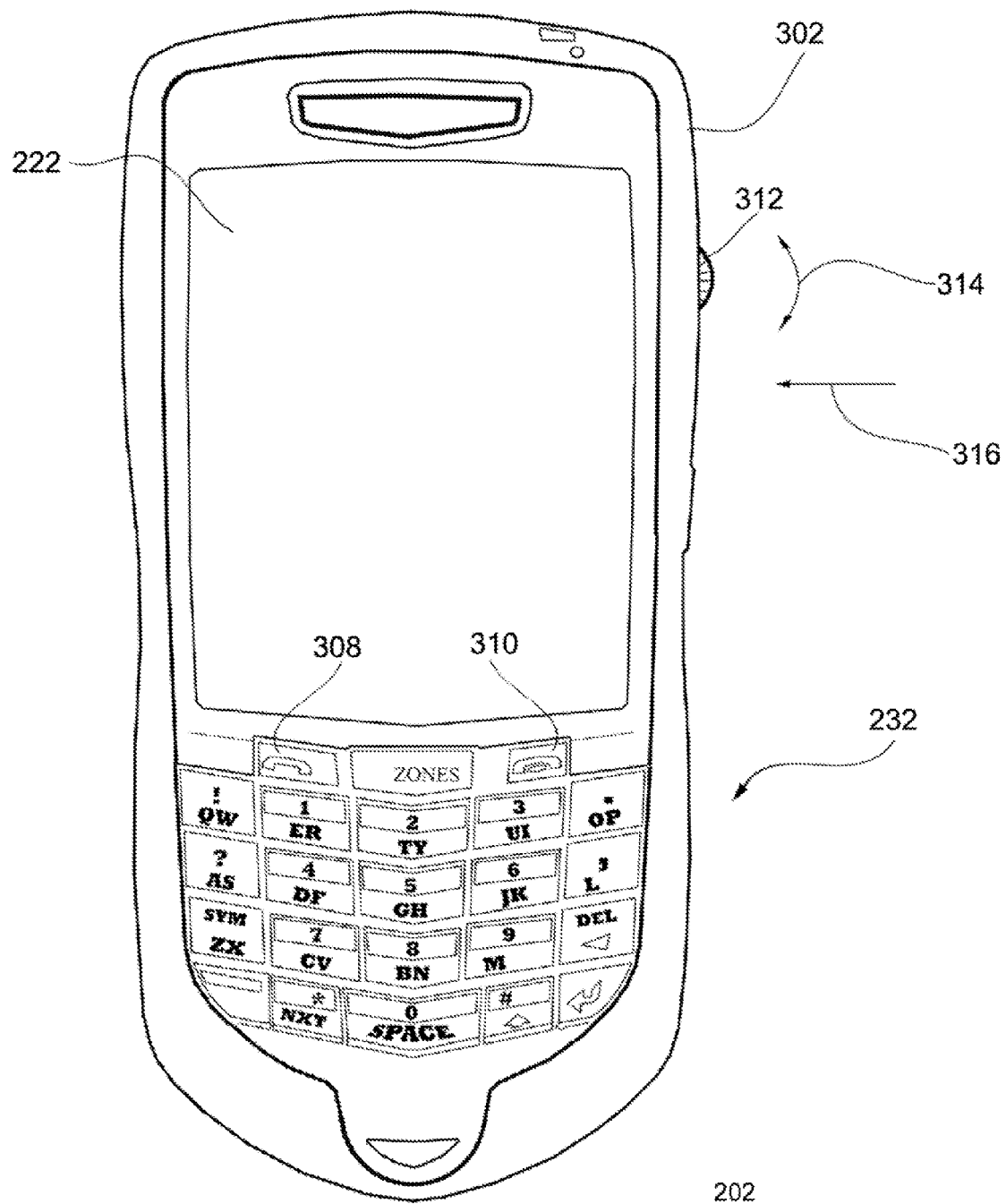
FIG. 3 is an illustration of a front side of an exemplary mobile station showing a user interface which includes a visual display and a plurality of keys.

FIG. 3 is a visual illustration of a front side of mobile station 202 which may employ the present user interface techniques. Mobile station 202 of FIG. 3 has a housing 302 which contains the electronic circuitry and components shown and described in relation to FIGS. 1-2. Housing 302 of mobile station 202 carries a user interface having visual display 222 and keypad 232 with a plurality of keys as earlier shown and described in relation to FIG. 2. As will be revealed in more detail in relation to FIGS. 4, 6, 7, 9, 10 and 12, visual display 222 is used to visually display information and messages for the user. As shown in FIG. 3, the plurality of keys of keypad 232 include a plurality of telephone digit keys (0, 1, 2, 3, 4, 5, 6, 7, 8, 9, *, and #) as well as control keys including a SEND key 308 (having a telephone handset icon inscribed thereon) and an END key 310 (having a telephone handset hang-up icon inscribed thereon). SEND and END keys 308 and 310 are mechanical switches of the mobile station which are detectable at switch inputs of the mobile station. In general, SEND key 308 is used by the user for initiating a telephone call from mobile station 202 through the wireless communication network, and END key 310 is used by the user for terminating the telephone call. Note that both SEND and END keys 308 and 310 are carried and exposed on a front side of housing 302. SEND key 308 may be alternatively designated as an ENTER key, an OK key, a START key, an ACCEPT key, etc.; similarly, END key 310 may be alternatively designated as a STOP key, a NO key, a DECLINE key, etc. Note that SEND and END keys 308 and 310 may alternatively be visual objects which are displayed in visual display 222 and detectable to the touch if visual display 222 is a touch screen display or other similar input device.

Given the relatively large size of visually displayed information and the compact size of visual display 222, information and messages are typically only partially presented in the limited view of visual display 222 at any given moment. Thus, mobile station 202 of FIG. 3 also includes an information viewing/selection mechanism for use with visual display 222. In the present embodiment, the information viewing/selection mechanism of mobile station 202 is a scrollwheel 312. Scrollwheel 312 is positioned on a right hand side of housing 302. Scrollwheel 312 generally includes a circular disc which is rotatable about a fixed axis of housing 302, and may be rotated by the user's index finger or thumb. See the directions indicated by a rotation arrow 314 of scrollwheel 312 shown in FIG. 3. When the information or message is being partially displayed, an upwards rotation of scrollwheel 312 causes an upwards scrolling such that visual display 222 presents viewing of an upper portion of the information or message. Similarly, a downwards rotation of scrollwheel 312 causes a downwards scrolling such that visual display 222 presents viewing of a lower portion of the information or message. Note also that scrollwheel 312 is mounted along a fixed linear axis such that the user can depress scrollwheel 312 inwards toward housing 302 (e.g. with the user's index finger or thumb) for selection of information. See the directions indicated by an arrow 316 of scrollwheel 312 shown in FIG. 3. Such lateral movement inwards toward the housing is detectable by the processor of the mobile station as a switch input (actuation or depression of the scrollwheel key). Although scrollwheel 312 of FIG. 3 has been shown and described as the preferred mechanism for use in viewing and selecting visually displayed information, any suitable viewing/selection mechanism may be utilized for the present user interface techniques to be described, such as UP and DOWN keys, a mouse and cursor mechanism, or a touch screen display mechanism.

Figure 4:
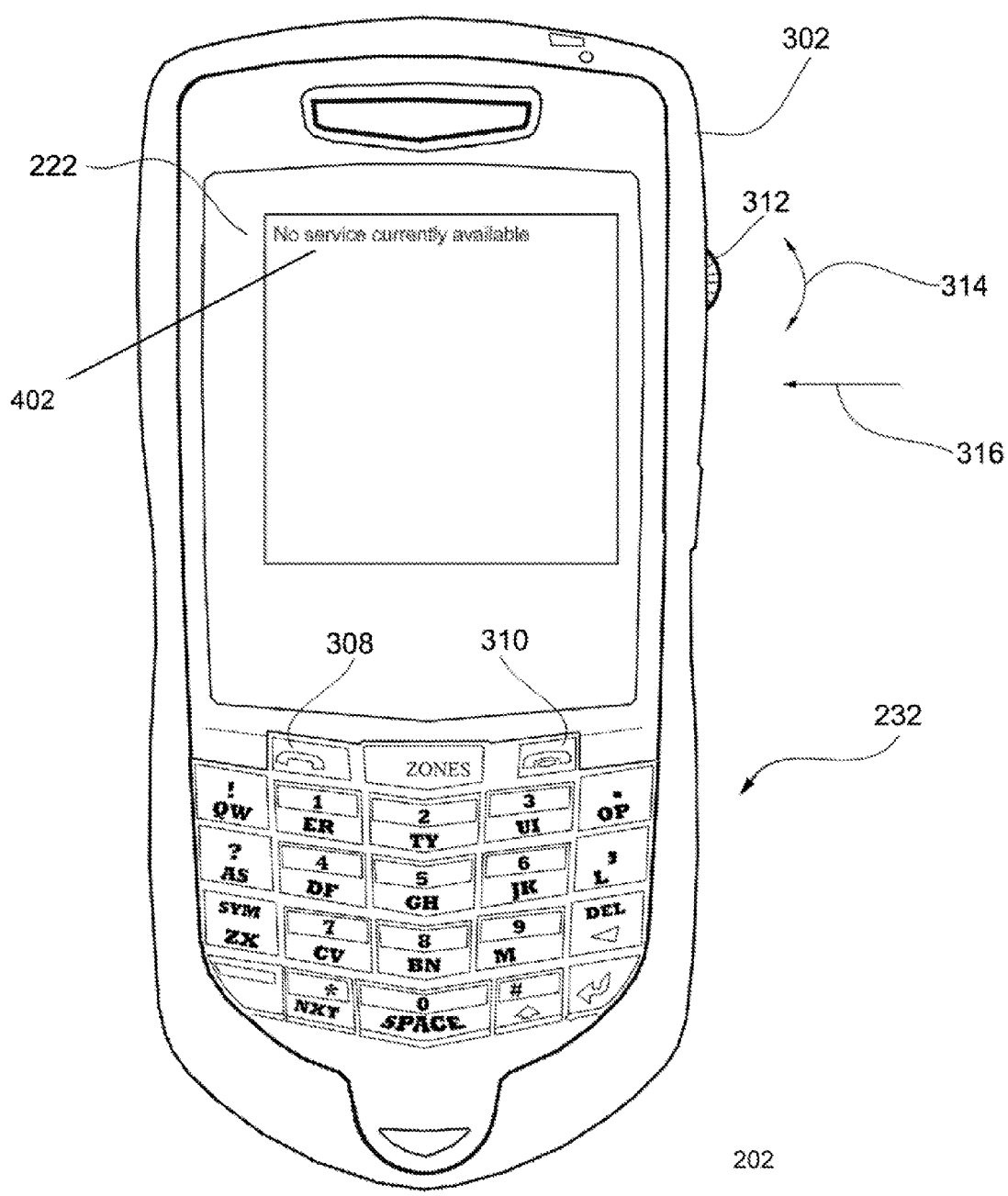
FIG. 4 is an illustration of the mobile station of FIGS. 1-3, where the visual display is displaying a message indicating "no service" or out-of-coverage condition of the mobile station.

FIG. 4 is a second visual illustration of the front side of mobile station 202. Existing products in the field display a message or indication of no service between a mobile station and its wireless communication network when a voice call attempt is initiated while operating in out-of-coverage conditions. One example is shown in FIG. 4 where, during out-of-coverage conditions, a "no service" or out-of-coverage message 402 may be displayed in visual display 222 indicating that service has been lost between mobile station 202 and wireless communication network 104. Visual display 222 in this illustration displays this out-of-coverage message 402 which specifically reads "No service currently available." Out-of-coverage conditions may be indicated by other like messages on a visual display or by some other indicator such as a colored light emitting diode (LED) or similar component, or by generating an audible indicator such as an audible tone or multi-tone or sequence of tones or multi-tones or like audible indicator.

Figure 5:
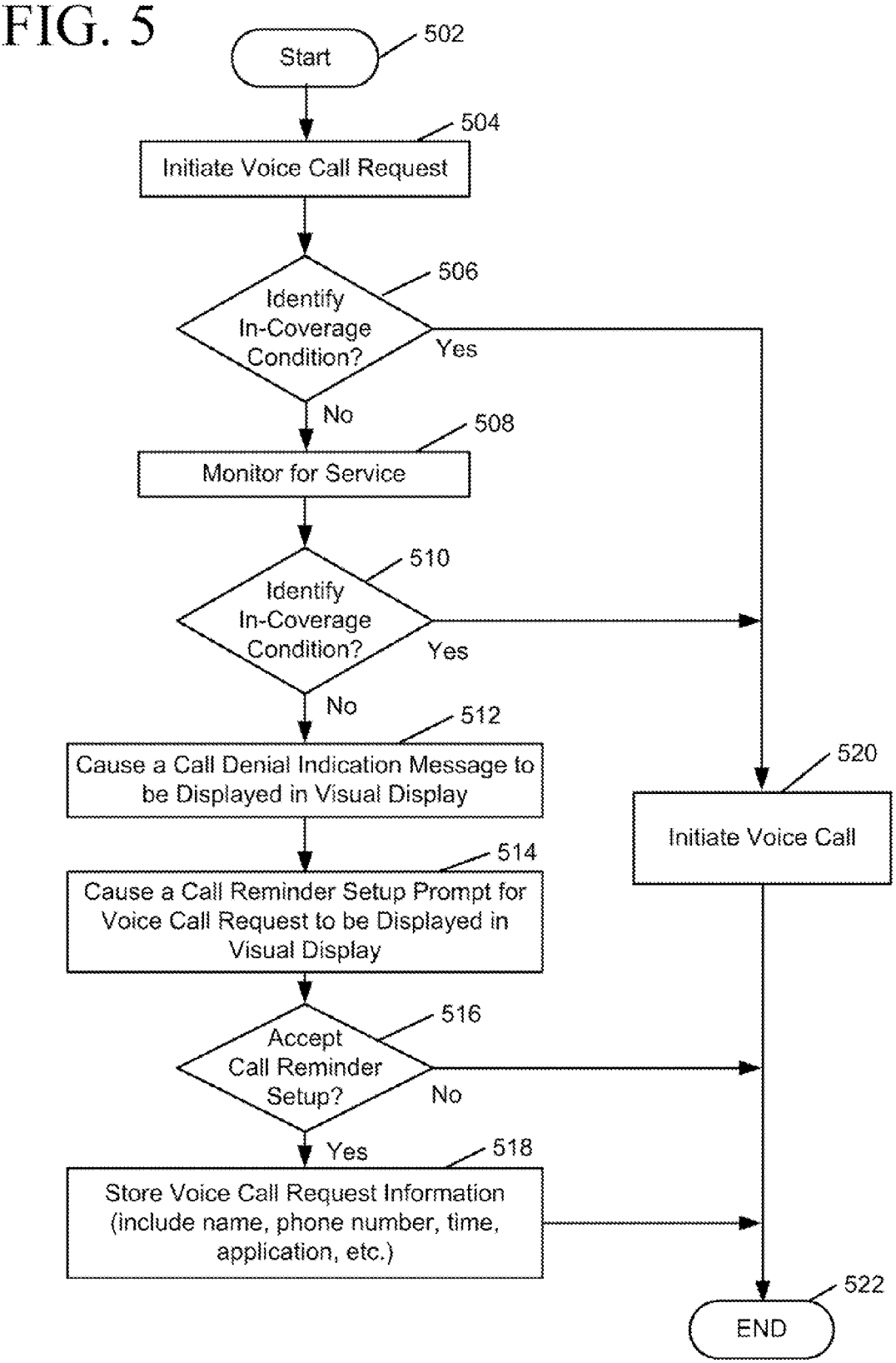
FIG. 5 is a flowchart which describes a first part of a user interface method for processing voice call requests based on communication conditions of the mobile station of FIGS. 1-4.

FIG. 5 is a flowchart for describing a first part of a user interface method for processing voice call requests based on communications conditions of a mobile communication device. A second part of the method is subsequently described in relation to the flowchart of FIG. 8. The method may be performed with use of a mobile communication device or mobile station operating in the wireless communication network as described in relation to FIGS. 1-4. A computer program product for the mobile station may include computer instructions stored on a storage medium (memory, a floppy disk or CD-ROM) which are written in accordance with the described logic of this method.

Figure 6:
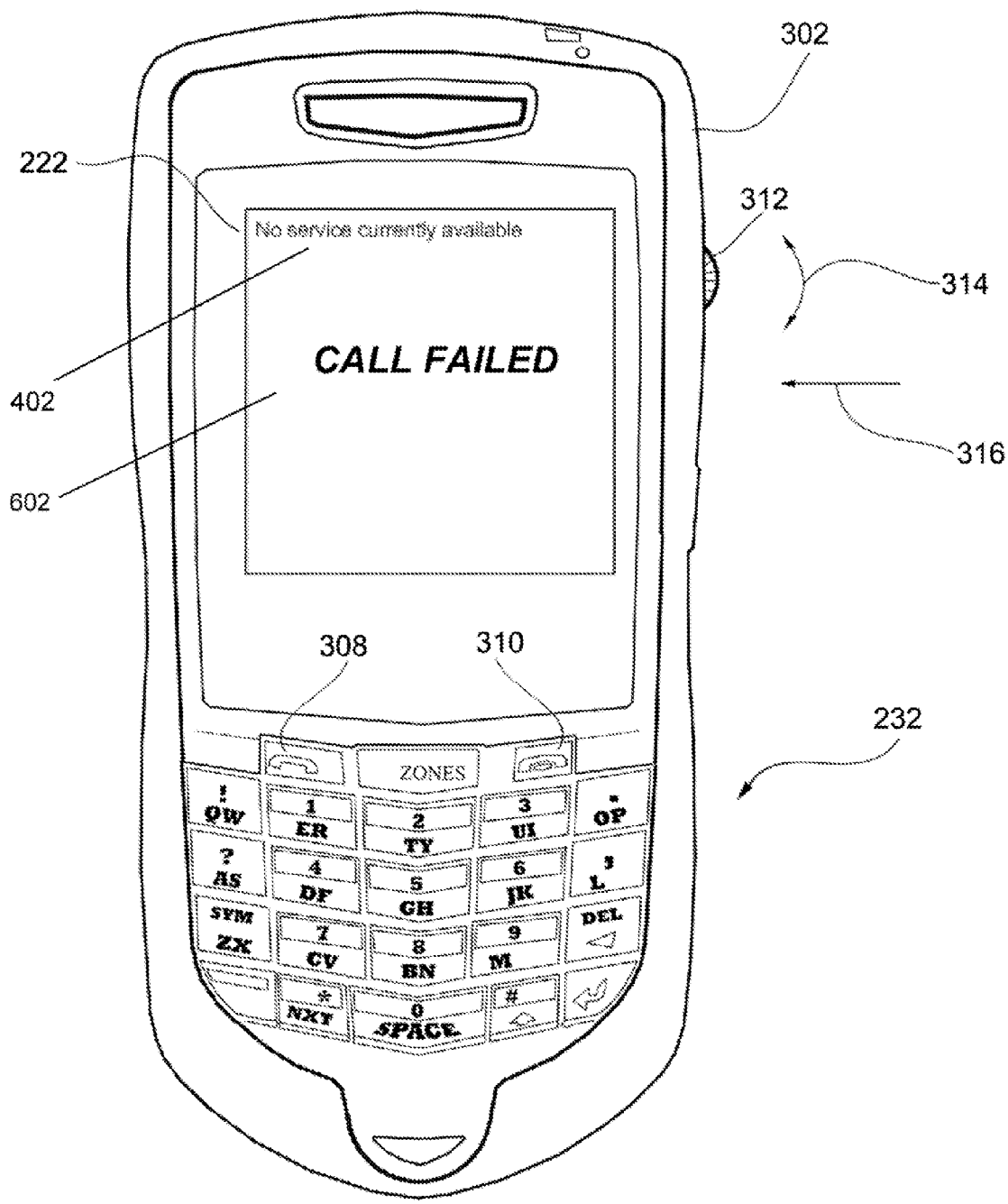
FIG. 6 is an illustration of the mobile station of FIGS. 1-3, where the visual display is displaying messages and prompts associated with a voice call denial.
Figure 7:
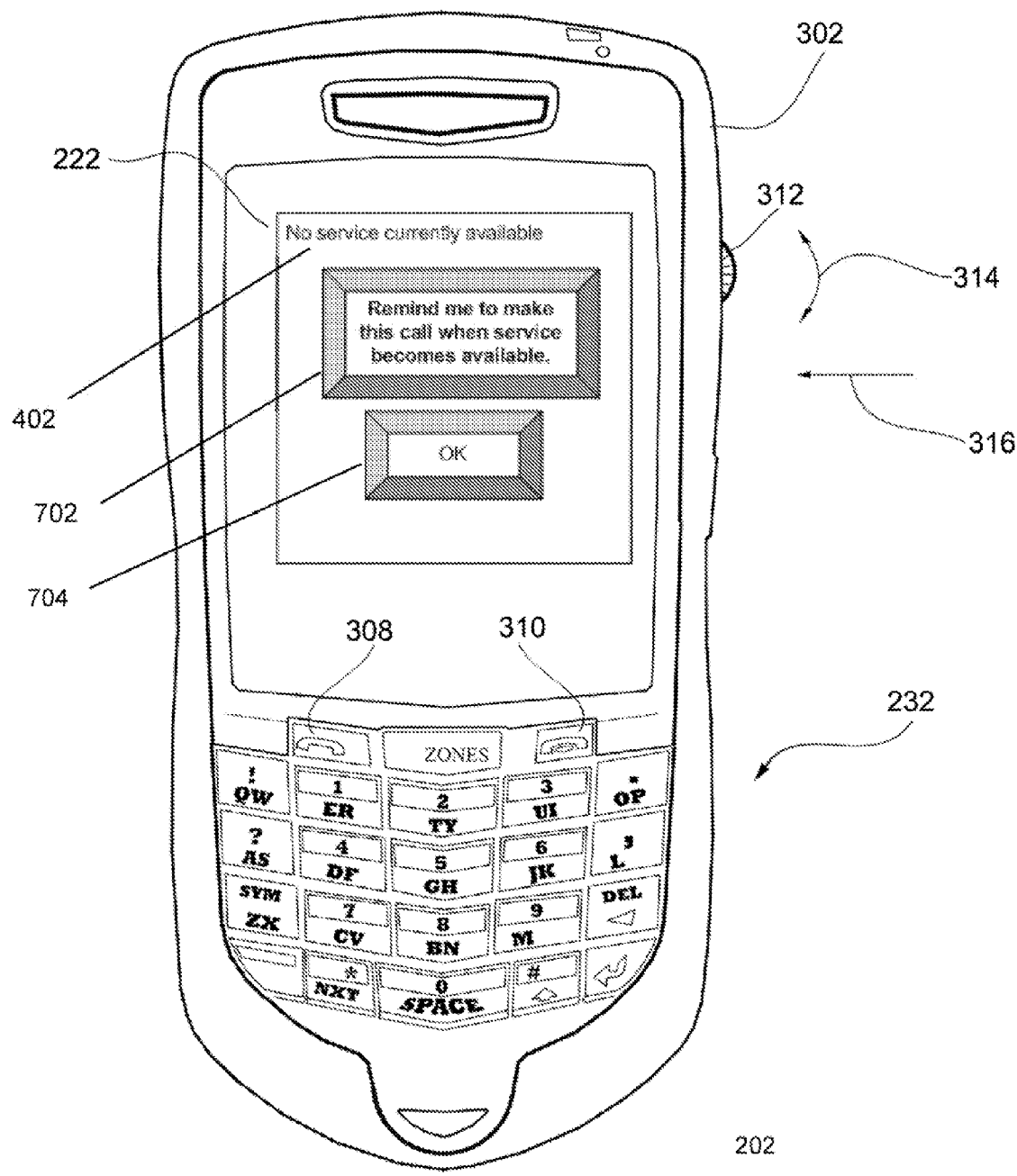
FIG. 7 is an illustration of the mobile station of FIGS. 1-3, where the visual display is displaying a call reminder setup prompt for a call reminder feature.

In combination with the flowchart of FIG. 5, reference will be made to the visual illustrations of the mobile station in FIGS. 6-7. Beginning at a start block 502 of FIG. 5, a user of the mobile station will submit a voice call request through a user interface of the mobile station (step 504 of FIG. 5). The user may initiate the voice call request by manually entering a telephone number using keypad 232 of FIG. 4, recalling a stored telephone number from memory using keypad 232, utilizing a voice recognition method if available, or utilizing another suitable means. The voice call request may involve depressing SEND button 308 of FIG. 4. When the voice call request is received by the processor of mobile station 202, the processor is operative to identify if mobile station 202 is operating in-coverage with any suitable wireless communication network (step 506 of FIG. 5). During an in-coverage condition, radio frequency (RF) communication signals of sufficient strength and quality are being communicated between mobile station 202 and a wireless communication network. If the in-coverage condition is identified in step 506, the voice call is initiated from mobile station 202 through its wireless transceiver (step 520 of FIG. 5) and the flowchart ends at an end block 522 of FIG. 5. If an in-coverage condition is not identified in step 506, then an out-of-coverage condition exists where RF communication signals between mobile station 202 and any suitable wireless communication network are not sufficient for communications.

When the out-of-coverage condition is identified in step 506, the processor utilizes the wireless transceiver to monitor for service between mobile station 202 and a wireless communication network (step 508 of FIG. 5). The act of monitoring for service by a mobile station may be a scanning operation where each usable channel within a frequency band of operation is scanned for activity. During the scanning operation, the processor identifies whether any detected RF signals within the usable frequency band are suitable for communications between the mobile station and the wireless communication network that is generating the detected RF signal. If a suitable wireless network is identified, an in-coverage condition exists with this network (step 510 of FIG. 5) and the voice call is initiated through the network (step 520 of FIG. 5). If after monitoring for service in step 508 a wireless communication network is not identified in step 510, the processor may optionally cause a "no service" or out-of-coverage message 402 (FIG. 6) and/or a call denial indication message 602 (FIG. 6) to be displayed in the visual display of mobile station 202 (step 512 of FIG. 5). Note that the "no service" or out-of-coverage message 402 (FIG. 6) may also be used effectively as a call denial indication message for the attempted voice call. If utilized, this message affirmatively provides an indication that the attempted voice call has failed.

Following any call denial indication message 602 (e.g. after an expiration of time or a user acknowledgement of the message through the user interface), the processor causes a call reminder setup prompt 702 (FIG. 7) for voice call request to be displayed in the visual display of mobile station 202 (step 514 of FIG. 5). Call reminder setup prompt 702 prompts the user to activate a call reminder feature of mobile station 202 if desired. If the user chooses to accept the call reminder feature through the user interface (as tested in step 516 of FIG. 5), the call reminder feature for the voice call request is activated and the processor causes voice call information (such as a person or business name, an outgoing telephone number, date, time of day when the voice call was attempted, communications application, and any other pertinent information) associated with the voice call request to be stored in memory (step 518 of FIG. 5). In one example, step 516 of FIG. 5 is performed where call reminder setup prompt 702 of FIG. 7 is highlighted by rotating scroll wheel 312 (action shown by rotation arrow 314 of FIG. 7) by the user and accepted by depressing scroll wheel 312 (action shown by lateral movement arrow 316 of FIG. 7). If the visual display is a touch screen display, the user may simply press a wand or finger on the visual display 222 over the area where call reminder setup prompt 702 appears.

If the user declines or refrains from accepting the call reminder feature as tested in step 516 of FIG. 5, the call reminder feature is not activated, no voice call request information is stored in memory, and the flowchart ends at end block 522 of FIG. 5. In one example, the call reminder feature is declined or not accepted if the user refrains from selecting the call reminder indication prompt 702 within a predetermined time period (e.g. within 5-10 seconds). In another example, a "decline," "cancellation," or "OK" prompt 704 (see FIG. 7) is simultaneously displayed in the visual display along with call reminder setup prompt 702 to give the user an option to affirmatively decline the feature.

In a variation of the technique, in response to receiving the voice call request and identifying an out-of-coverage condition at step 510 of FIG. 5, the processor may be configured to automatically activate the call reminder feature and store the voice call reminder and voice call information in memory of mobile station 202 without user intervention (e.g. without visually displaying call reminder setup prompt 702 and without selecting or actuating any call reminder setup prompt 702). In this case where the voice call reminder is stored automatically, steps 514 and 516 of FIG. 5 are skipped.

Figure 8:
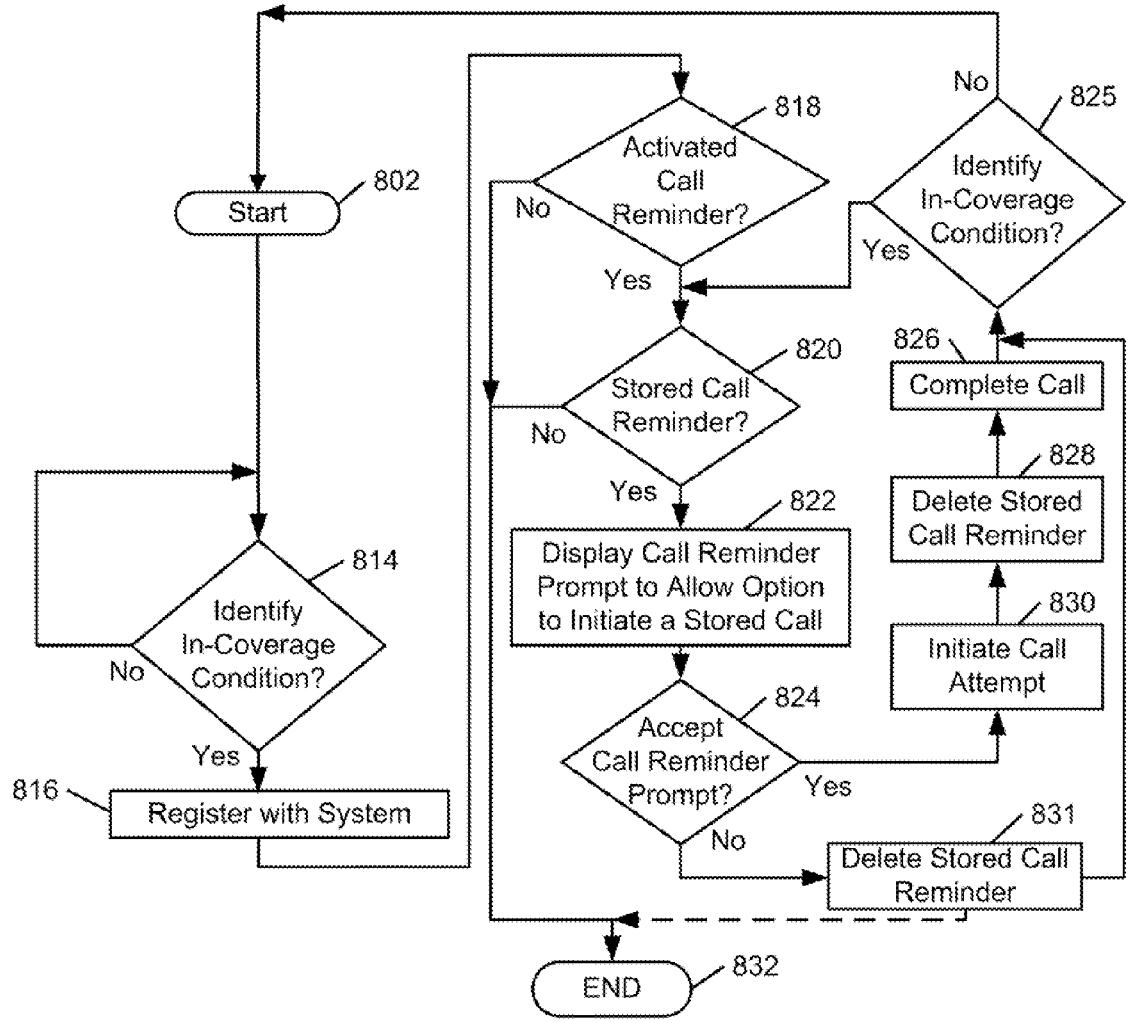
FIG. 8 is a flowchart which describes a second part of the user interface method of processing voice call requests based on communication conditions of the mobile station of FIGS. 1-3.

FIG. 8 is a flowchart for describing the second part of the user interface method of the present disclosure for processing voice call requests based on communication conditions of the mobile station. The first part of the user interface method was previously described in relation to FIG. 5. The method may be performed with use of a mobile station operating in the wireless communication network as described in relation to FIGS. 1-4. A computer program product for the method may include computer instructions stored on a storage medium (memory, a floppy disk or CD-ROM) which are written in accordance with the described logic of this method.

Figure 9:
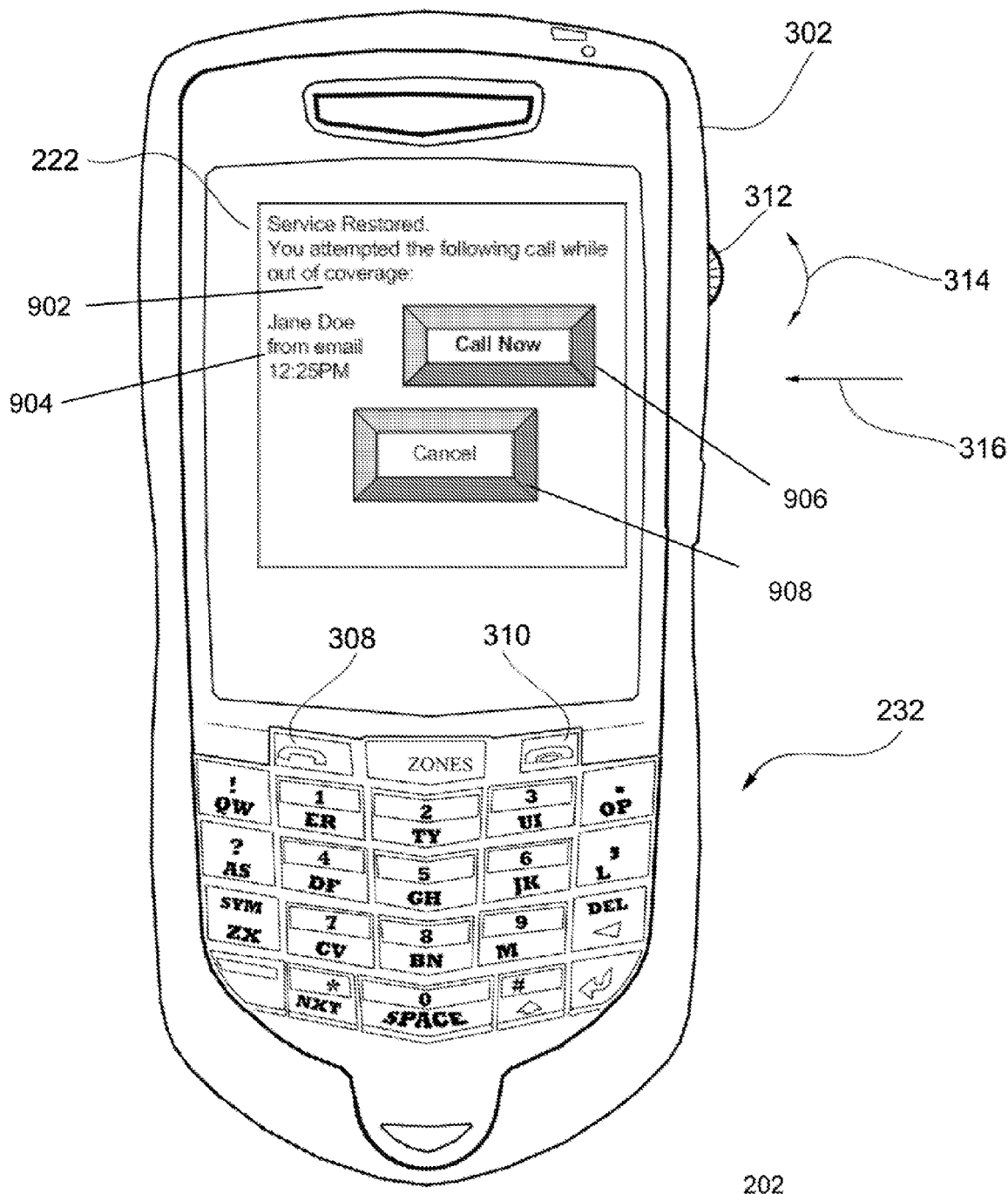
FIG. 9 is an illustration of the mobile station of FIGS. 1-3, where the visual display is displaying a call reminder prompt for reattempting a previous voice call.
Figure 10:
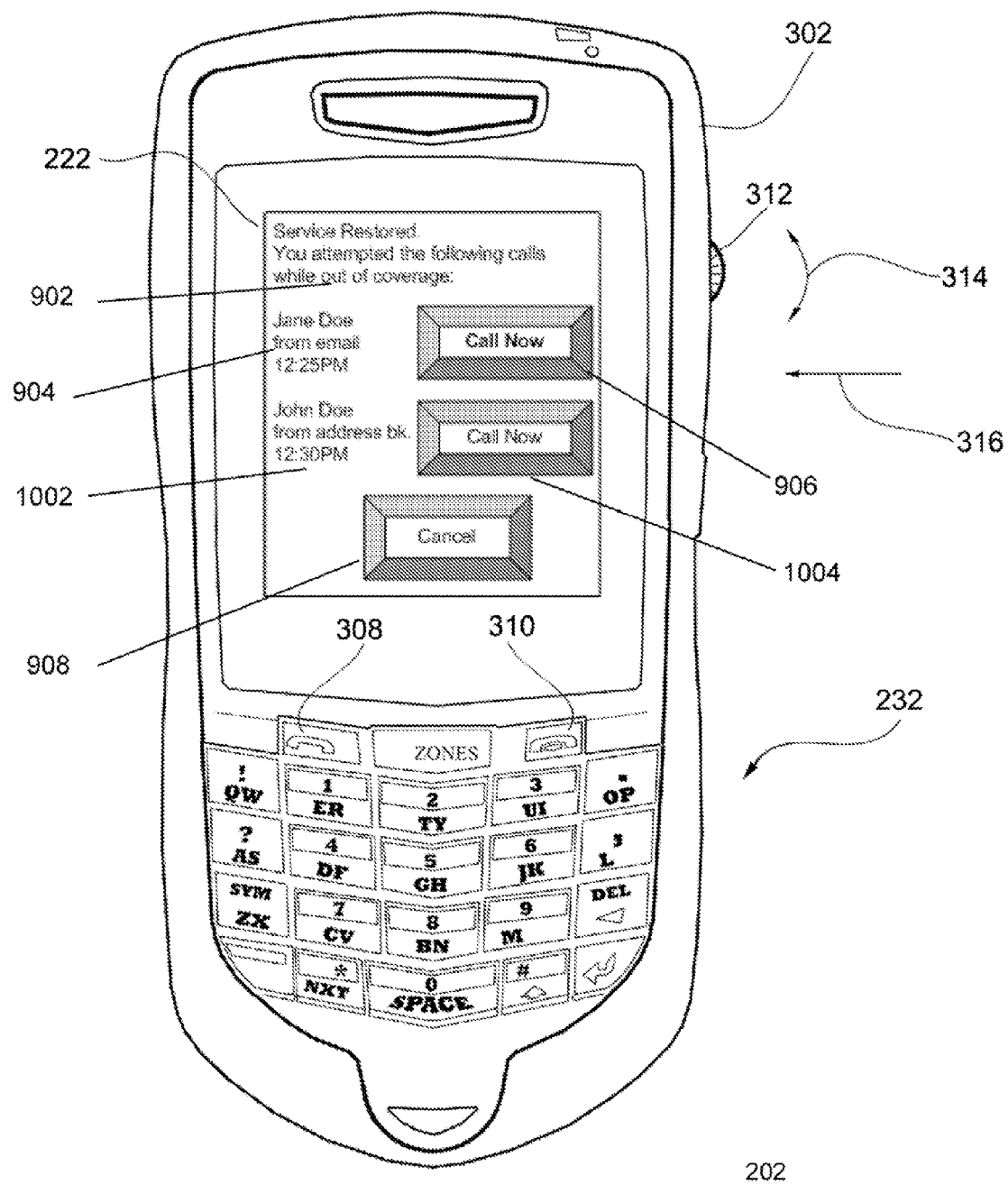
FIG. 10 is an illustration of the mobile station of FIGS. 1-3, where the visual display is displaying multiple call reminder prompts.

In combination with the flowchart of FIG. 8, reference will be made to the visual illustrations of the mobile station in FIGS. 9-10. The flowchart begins where mobile station 202 is not in-coverage with any wireless communication network for communications (i.e. mobile station 202 is out-of-coverage). Beginning at a start block 802 of FIG. 8, the processor regularly monitors to identify whether any in-coverage condition exists between mobile station 202 and a suitable wireless communication network (step 814 of FIG. 8). When service is restored between the mobile station and a wireless communication network, a process begins that will allow the user to process any previously-denied voice call requests.

After successfully registering with the wireless communication network (step 816 of FIG. 8), the processor identifies whether the call reminder feature is generally enabled or activated (step 818 of FIG. 8). If a call reminder feature is not enabled or activated at step 818, then the flowchart ends at an end block 832 of FIG. 8. Once an in-service condition has been re-established between the mobile station and a wireless communication network, the present method will begin a repetitive process for handling stored voice call requests that were previously denied while operating in out-of-coverage conditions. The process will not be performed if the call reminder feature is not activated or if no call reminders were stored in memory, but will be performed one or more times depending on the number of stored voice call reminders and choices made by the user for activating any stored call reminders. The process may also be interrupted if an out-of-coverage condition is detected while processing stored voice call reminders, or if power to mobile station 202 is interrupted.

If the call reminder feature is activated or enabled at step 818, and one or more call reminders are stored in memory (as tested in step 820 of FIG. 8), a call reminder prompt will be displayed in the visual display of mobile station 202 (step 822 of FIG. 8). The call reminder prompt allows the user the option of initiating a previously stored voice call request. After service has been restored between mobile station 202 and a wireless communication network, the processor causes a generic "service restored" message 902 (see FIG. 9) to be displayed indicating that service has been restored and voice call(s) were attempted while operating in out-of-coverage conditions. Voice call information message 904 may also be displayed which shows information about a previously denied voice call request stored in memory. Voice call information may include a person or business name, an outgoing telephone number, date, time of day when the voice call was attempted, communications application, and any other pertinent information associated with the voice call request.

In addition, the processor may cause a voice call reminder prompt 906 as well as a cancellation prompt 908 to be shown in visual display 222 of mobile station 202 which allows the user to accept or decline, respectively, the previously denied voice call request. The user may highlight and select the visual prompts using rotatable and lateral movements of scrollwheel 312 of FIG. 9 or any other suitable selection methods. If call reminder prompt 906 is chosen through the user interface (as tested at step 824 of FIG. 8), the processor causes the voice call to be initiated without further user intervention (step 830 of FIG. 8). This is followed by deletion of stored call reminder information from memory (step 828 of FIG. 8), and subsequent completion of the voice call (step 826 of FIG. 8). If cancellation prompt 908 is chosen in step 824, the call reminder information is deleted from memory (step 831 of FIG. 8) and therefore not subsequently acted upon.

Following completion of the stored voice call request at step 826 or deletion of call reminder information (step 831 of FIG. 8), the processor monitors to identify whether an in-coverage condition still exists (step 825 of FIG. 8). If an in-coverage condition is not identified, the process returns to step 802 of FIG. 8 to attempt to gain access to a wireless communication network. If an in-coverage condition is identified in step 825, the process returns to check its memory for any further stored call reminders (step 820 of FIG. 8) and process each stored voice call request as described above. This process will continue until all stored call reminders are cleared from memory.

A further technique involves activating the call reminder feature only after a minimum time duration of continuous out-of-coverage has existed after the voice call request is received. For example, while an out-of-coverage condition persists for less than a minimum time duration (e.g. 30 seconds) after a voice call request is received, a call reminder setup prompt is not immediately displayed and a call reminder is not immediately stored. Over the minimum time duration, the processor causes repeated attempts to be made to restore service before any call reminder setup prompt is displayed and/or voice call reminder is stored in memory. If an in-coverage condition is identified before expiration of the minimum time duration, the voice call is initiated in response to the voice call request; if the out-of-coverage condition persists for the minimum time duration, then the processor causes the call reminder setup prompt to be displayed and/or the call reminder to be stored upon expiration. A programmable setting may be provided for setting the minimum time duration for displaying the call reminder setup prompt or storing voice call reminders while operating in out-of-coverage conditions.

On the other hand, a call reminder prompt may be displayed in the visual display at a time when the mobile device is still not in steady, continuous RF coverage. This situation is undesirable as the user may accept the prompt at a time when the mobile device is out-of-coverage, potentially leading to another call failure. In this case, the processor operates to cause the call reminder prompt to be displayed only after and in response to detecting a steady, continuous in-coverage condition for a minimum time duration (e.g. between 10-60 seconds); the processor refrains from displaying the call reminder prompt while no steady, continuous in-coverage condition is identified. If a call reminder prompt is displayed in the visual display after a steady, continuous in-coverage condition is identified, but an out-of-coverage condition is subsequently identified by the processor, the processor may operate to withdraw and remove the call reminder prompt from the visual display and restore the stored call reminder for later issuance.

A further option of the present disclosure involves retaining the call reminder in memory for manual acceptance by the user at a later time. In this case, a list of one or more call reminders may be stored in the memory and later retrievable by the user at a time that is suitable for the user. In FIG. 8, after the cancellation prompt is selected (step 824 of FIG. 8), an additional step may cause a prompt on the visual display which allows the user to retain the call reminder information in memory for use at a later time, for example.

The method in the flowchart FIG. 8 may process stored voice call reminders serially, as described above, or may process voice call reminders as a group. FIG. 10 shows an example of multiple call reminders displayed on visual display 222 of mobile station 202. In addition to service restored message 902, voice call information message 904, and voice call reminder prompt 906, visual display 222 of mobile station 202 may also include a second voice call information message 1002 which will show information about a second denied voice call request, second voice call reminder prompt 1004 for accepting the second voice call described in second voice call information message 1002, along with cancellation prompt 908. The user may choose to accept the call reminder corresponding to voice call information message 904 or, alternatively, the call reminder corresponding to second voice call information message 1002, by accepting voice call reminder prompt 906 or second voice call reminder prompt 1004, respectively. In this example of handling multiple voice reminders, cancellation prompt 908 of FIG. 10 allows the user to deny all the voice call requests which are presently displayed on visual display 222. Again, the user may initiate a voice call or deny the call(s) using rotatable and lateral movements of scrollwheel 312 or any other suitable selection methods described above.

Additional voice call reminder messages and voice call prompts may be shown on visual display 222 as space permits. Alternatively, when multiple voice call reminder messages/prompts are to be presented, an additional prompt may be included that will allow the user to view additional messages/prompts that may be stored in memory if the visual display is not capable of displaying all of them on the same screen. Such a message on a visual display may contain messages such as "NEXT" or "PREV" to allow the user to view the next or previous set of voice call reminder information messages stored in memory. Further, if multiple voice call reminder messages and voice call reminder prompts are shown on one page, a screen scrolling procedure may be required to view voice call information that is not presently shown on the visual display. Selection of a "NEXT" or "PREV" prompt and screen scrolling may be performed by the user with the use of rotatable and lateral movements of scrollwheel 312 or any other selection methods described above.

Figure 11:
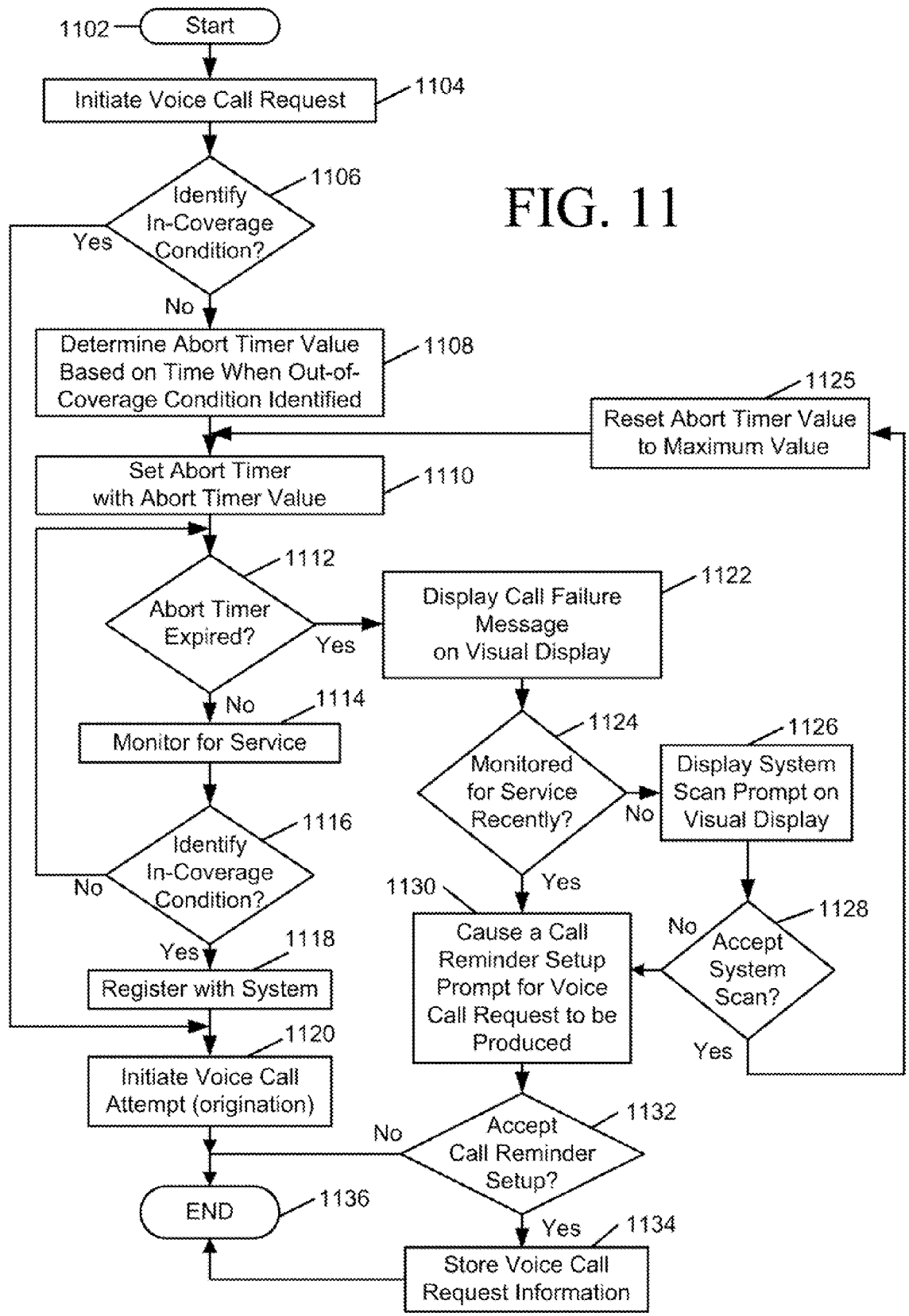
FIG. 11 is a flowchart which describes a variation of the user interface method of processing denied telephone calls from the mobile station of FIGS. 1-3 with inclusion of a timer which is initialized based on a duration of the current out-of-coverage condition.

FIG. 11 is a flowchart for describing a variation of the user interface method of processing voice call requests from the mobile station with inclusion of an abort timer which is initialized based on a duration of a current out-of-coverage condition. The method may be performed with use of a mobile station operating in the wireless communication network as described in relation to FIGS. 1-4. A computer program product for the mobile station may include computer instructions stored on a storage medium (memory, a floppy disk or CD-ROM) which are written in accordance with the described logic of this method.

When a voice call is requested while operating in out-of-coverage conditions, conventional techniques may monitor or scan for service in order to complete the voice call request with or without providing any indication to the user that monitor or scan is underway. The user interface (e.g. a visual display) may not indicate that the voice call request could be completed until a complete scan of the useable frequency band has completed. Complete scanning of the useable frequency band may last as long as several minutes, and may delay any indication to the user that the voice call request could be completed. The length of this delay may be unreasonable, and would also delay any call reminder setup prompt from being displayed and utilized as well.

Accordingly, a variable timer technique of the present disclosure utilizes recorded times of identified out-of-coverage conditions to reduce a time delay from when a voice call request is initially placed to when messages are displayed on a visual display indicating that the voice call request could be completed. One way of reducing the time delay is to utilize a recently-recorded out-of-coverage condition time. A time delay value may be inversely proportional to the time period since the most recent out-of-coverage condition was recorded relative to a time when the voice call request is initiated, providing almost immediate call denial/call reminder prompt indication to the user if the out-of-coverage condition has been present for a relatively long period of time. If the out-of-coverage condition has been present for a relatively long period of time, this indicates that a scanning operation has also been active during a long period. In that case, little or no further scanning needs to be performed prior to providing a call denial message and/or call reminder prompt to the user. On the other hand, if the out-of-coverage condition has been present only for a relatively short period of time, this indicates that the scanning operation has only been active during a short period. In that case, further scanning should be performed prior to providing a call denial message and/or call reminder prompt to the user.

Figure 12:
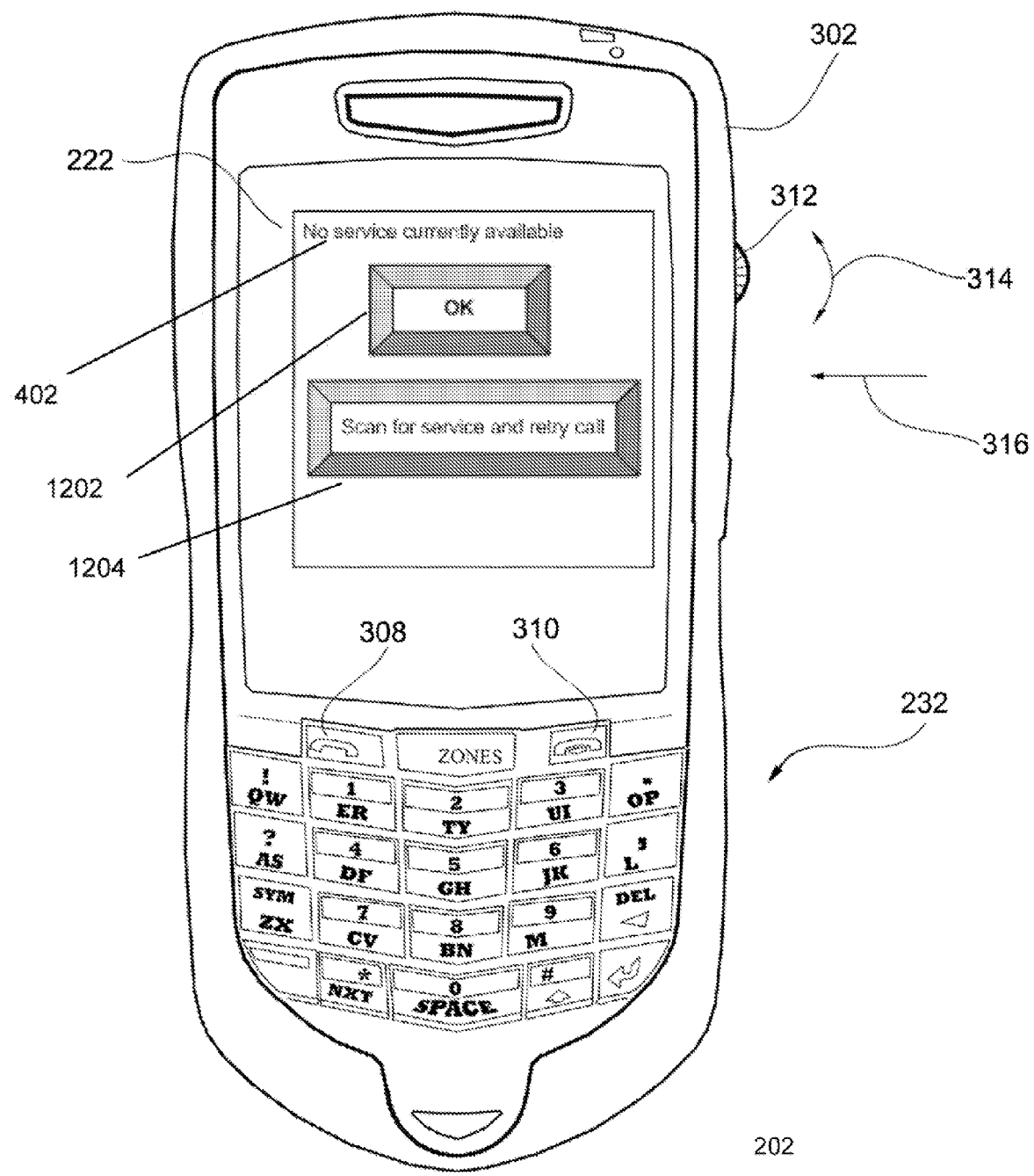
FIG. 12 is an illustration of the mobile station of FIGS. 1-3, where the visual display is displaying a prompt to scan for service.

In combination with the flowchart of FIG. 11, reference will be made to the visual illustrations of the mobile station in FIGS. 3, 7 and 12. Beginning at a start block 1102 of FIG. 11, a user initiates a voice call request through the user interface of mobile station 202 (step 1104 of FIG. 11). The user may initiate the voice call request by manually entering a telephone number using keypad 232 of FIG. 3, recalling a stored telephone number from memory using keypad 232, by utilizing a voice recognition method if available, or some other suitable means. The voice call request may involve depressing SEND button 308 of FIG. 3 after the selection of a telephone number.

When the voice call request is received by a processor of the mobile station, the processor identifies if mobile station 202 is operating in an in-coverage condition (step 1106 of FIG. 11). If an in-coverage condition is not identified as tested in step 1106 (i.e. an out-of-coverage condition exists), an abort timer value is calculated based on a duration of the most recent identification of an uninterrupted out-of-coverage condition (step 1108 of FIG. 11). The abort timer may be set inversely proportional to a time period over which the current out-of-coverage condition existed between the mobile communication device and a wireless communication network prior to receiving the voice call request. Maximum and minimum time values may be used to limit the range of the abort timer. Subsequent identification of an in-coverage condition may cause the abort timer to reset to its default value, and may also cause the mostly recently stored out-of-coverage condition time to be cleared from memory.

After the abort timer value is loaded into the abort timer and the abort timer is set to run (step 1110 of FIG. 11), and until the abort timer has expired (as tested in step 1112 of FIG. 11), the processor causes a monitoring for service between mobile station 202 and a compatible wireless communication network (step 1114 of FIG. 11). Preferably, the monitoring is a scanning operation. If, while monitoring for service, an in-coverage condition is identified with a compatible wireless network (as tested in step 1116 of FIG. 11), mobile station 202 registers with the wireless network (step 1118 of FIG. 11). Subsequently, the voice call for the voice call request is initiated by the processor using the wireless transceiver (step 1120 of FIG. 11), and the process terminates and returns to normal operation at an end block 1136 of FIG. 11. If after monitoring for service in step 1114, an in-coverage condition is not identified in step 1116, the process returns to step 1112 of FIG. 11 to determine if the abort timer has expired.

When the abort timer has expired (step 1112 of FIG. 11), a call denial indication message may be displayed on the visual display of mobile station 202 (step 1122 of FIG. 11). See e.g. indication message 602 of FIG. 6. If a full system scan has occurred recently (as tested at step 1124 of FIG. 11), the processor causes a call reminder setup prompt for voice call request to be displayed in the visual display of mobile station 202 (step 1130 of FIG. 11). For example, see prompt 702 of previous FIG. 7. The call reminder setup prompt prompts the user to activate a call reminder feature of the mobile station if desired. If the user chooses to accept the call reminder feature through the user interface (as tested in step 1132 of FIG. 11), the call reminder feature for the voice call request is activated and the processor causes voice call information (such as a person or business name, an outgoing telephone number, date, time of day when the voice call was attempted, communications application, and any other pertinent information) associated with the voice call request to be stored in memory (step 1134 of FIG. 11). In one example, step 1132 of FIG. 11 is performed where the call reminder setup prompt is highlighted by rotating the scrollwheel and accepted by depressing the scrollwheel.

If the user declines or refrains from accepting the call reminder feature as tested in step 1132 of FIG. 11, the call reminder feature is not activated, no voice call request information is stored in memory, and the flowchart ends at end block 1136 of FIG. 11. In one example, the call reminder feature is declined or not accepted if the user refrains from selecting the call reminder indication prompt within a predetermined time period (e.g. within 5-10 seconds). In another example, a "decline," "cancellation," or "OK" prompt (see prompt 704 of FIG. 7) is simultaneously displayed in the visual display along with the call reminder setup prompt to give the user an option to affirmatively decline the feature. In a variation of the technique, at the YES branch in step 1124 of FIG. 11, the processor may be configured to automatically activate the call reminder feature and store the voice call reminder and voice call information in memory of the mobile station without user intervention (e.g. without visually displaying the call reminder setup prompt and without selecting or actuating any call reminder setup prompt). In this case where the voice call reminder is stored automatically, steps 1130 and 1132 of FIG. 11 are skipped.

If a full system scan has not occurred recently as tested in step 1124, the processor causes an indication to be displayed on the visual display corresponding to a system scan prompt (step 1126 of FIG. 11). In FIG. 12, an example of a system scan prompt 1204 is shown in visual display 222 of mobile station 202. Note also that a "decline," "cancellation," or "OK" prompt 1202 may be simultaneously displayed in visual display 222 along with system scan prompt 1204 to give the user an option to affirmatively decline the scan. If the user accepts the system scan prompt through the user interface (as identified in step 1128 of FIG. 11), the abort timer value is set to its maximum value to allow adequate time for a full system scan (step 1125 of FIG. 11). The flowchart then returns to step 1110 where the abort timer is loaded with the maximum abort timer value. If the system scan prompt is not accepted or is declined through the user interface at step 1128, the flowchart continues at step 1130 where the user has the option to select and call reminder information may or may not be stored.

Again, if an out-of-coverage condition has been present for a relatively long period of time, this indicates that a scanning operation has also been active during a long period. In that case, little or no further scanning needs to be performed prior to providing such call denial message and/or call reminder setup prompt to the user. On the other hand, if the out-of-coverage condition has been present only for a relatively short period of time, this indicates that the scanning operation has only been active during a short period. In that case, further scanning should be performed prior to providing such call denial message and/or call reminder setup prompt to the user. As apparent, the abort timer is initialized and set appropriately for such operation.

Thus, user interface methods and apparatus for processing voice call requests based on communication conditions of a mobile communication device have been described. The mobile communication device of the present disclosure may include one or more processors, a wireless transceiver coupled to the one or more processors, and a user interface which includes a visual display. In one illustrative embodiment, a voice call request for a voice call is received through the user interface. If the voice call request is received during an out-of-coverage condition of the mobile communication device, the processor causes a call denial indication to be displayed in the visual display, which indicates that the voice call request could not be completed. The processor also causes a call reminder setup prompt to be displayed, which may be accepted or declined through the user interface. If an acceptance of the call reminder setup prompt is received, the processor causes a call reminder prompt for reattempting the voice call to be displayed when an in-coverage condition of the mobile communication device is subsequently identified. The call reminder prompt, which also may be accepted or declined through the user interface, reveals various call information regarding the previous voice call request such as the telephone number, name, and time of the previous request. If the call reminder prompt is accepted, the processor causes a voice call associated with the voice call request to be initiated. Advantageously, previous call attempts for voice calls made during out-of-coverage conditions may be re-initiated with helpful, easy-to-use, intelligent call reminders.

A related problem is associated with pre-established calendar appointments made via a calendar application of the mobile station. Such calendar appointments are stored in memory of the mobile station and are typically associated with calendar information which includes a date, time, and/or time period of the appointment. The calendar information of the calendar application may be automatically synchronized with a corresponding calendar application on a computer (e.g. a PC) of a local area network (LAN) via the wireless communication network. Thus, such calendar information may be received from the user interface of the mobile station or via the wireless communication network. The calendar appointment may or may not be for an anticipated scheduled voice call (e.g. a conference call) utilizing the mobile station. If the calendar appointment is for such a scheduled call, wireless coverage is required for the mobile station. That is, at the date and time of the appointment, the mobile station must be located within RF coverage range of the wireless communication network to make or receive the call for the appointment. If not, the user may miss or be late for the scheduled call. Note that the user may not be aware of any RF coverage problem until the calendar application reminds the user of the appointment, at or near the date and time of the appointment. This problem is more generally associated with any stored appointment or item in the mobile station having a pre-established scheduled date and/or time, such as a task appointment of a task application.

Figure 13:
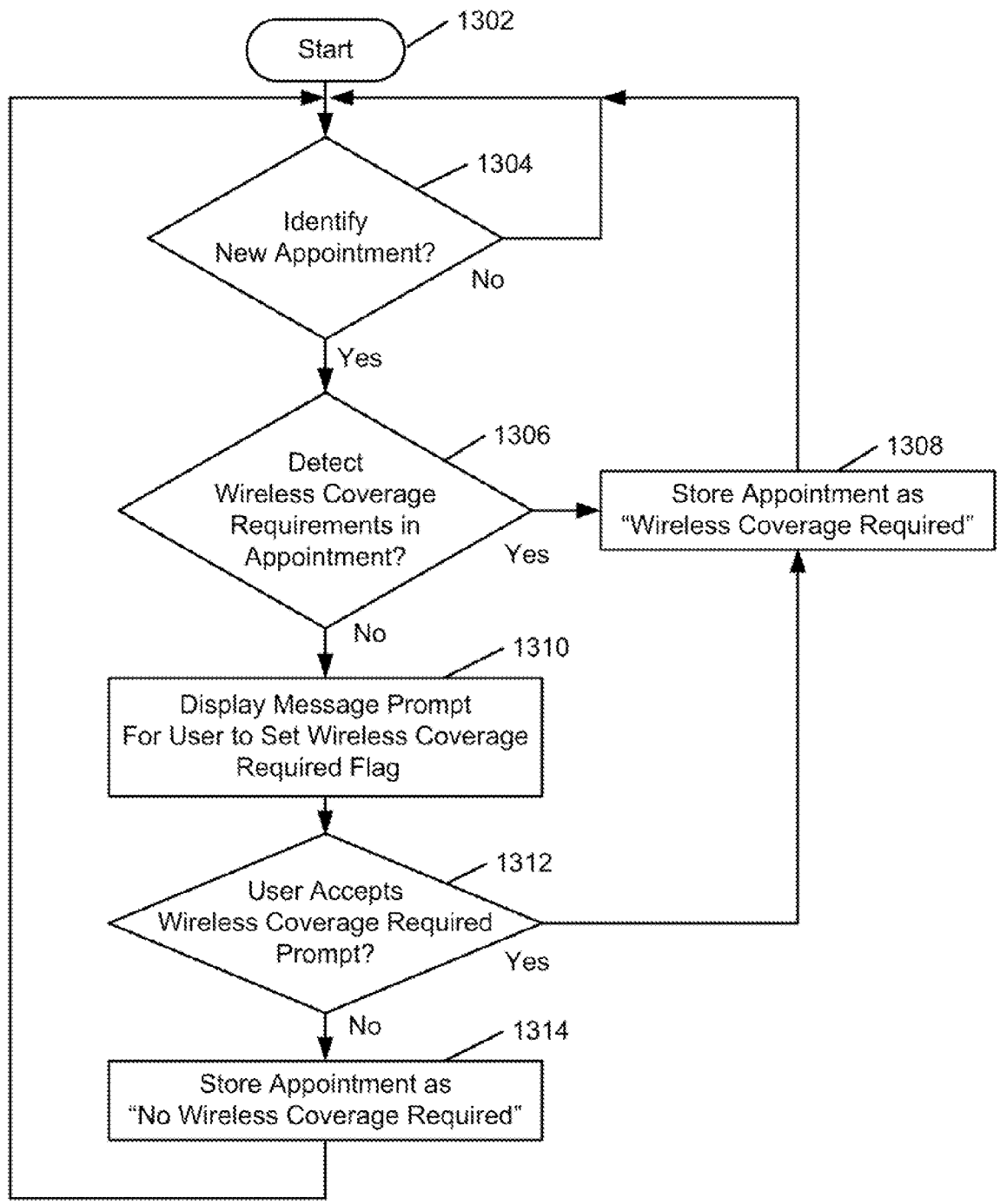
FIG. 13 is a flowchart which describes a method for indicating whether wireless coverage is required for a new appointment to be stored in memory of the mobile station of FIGS. 1-3.
Figure 18:
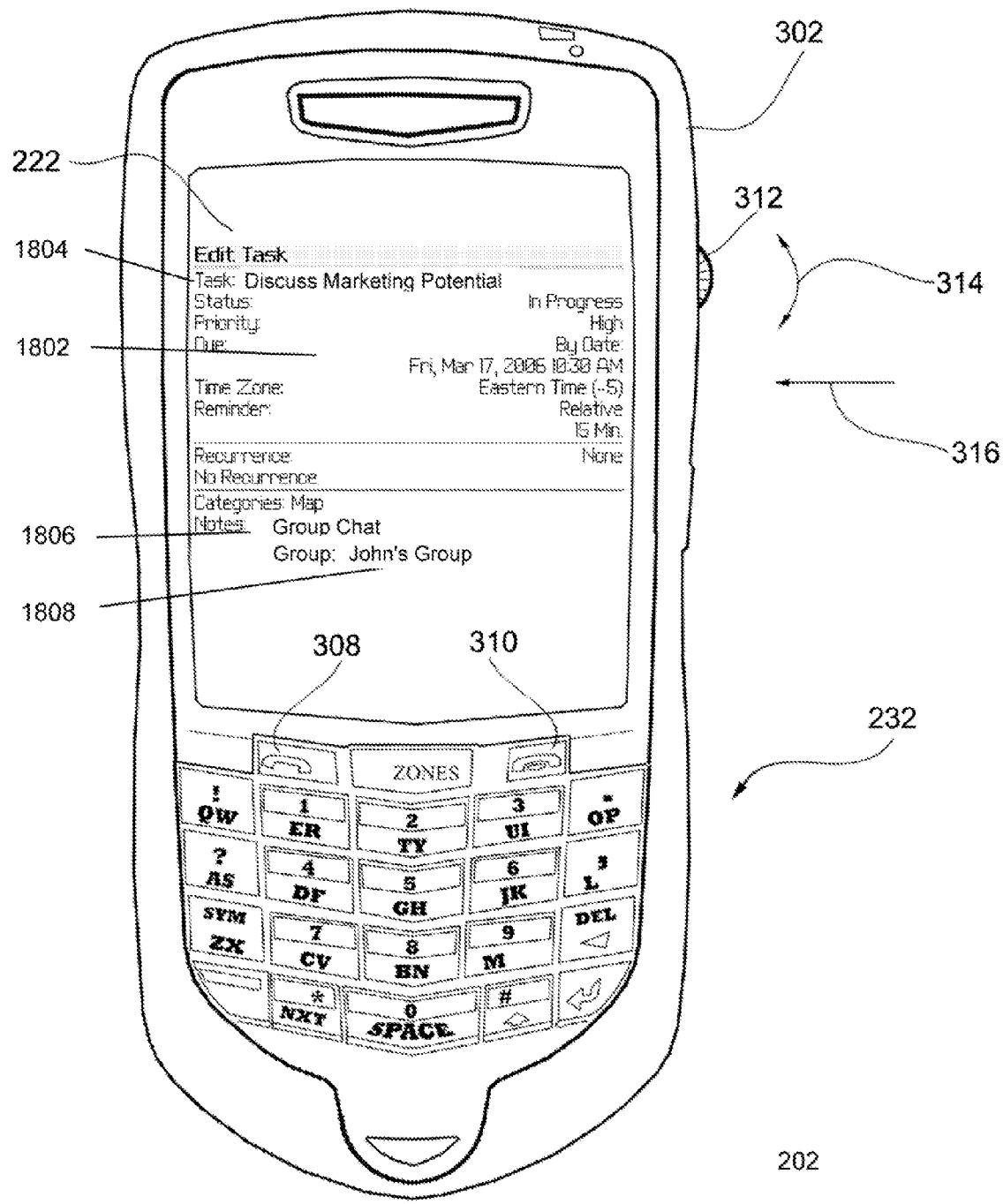
FIG. 18 is an illustration of the mobile station of FIGS. 1-3, where the visual display is displaying a stored task of a task application.
Figure 19:
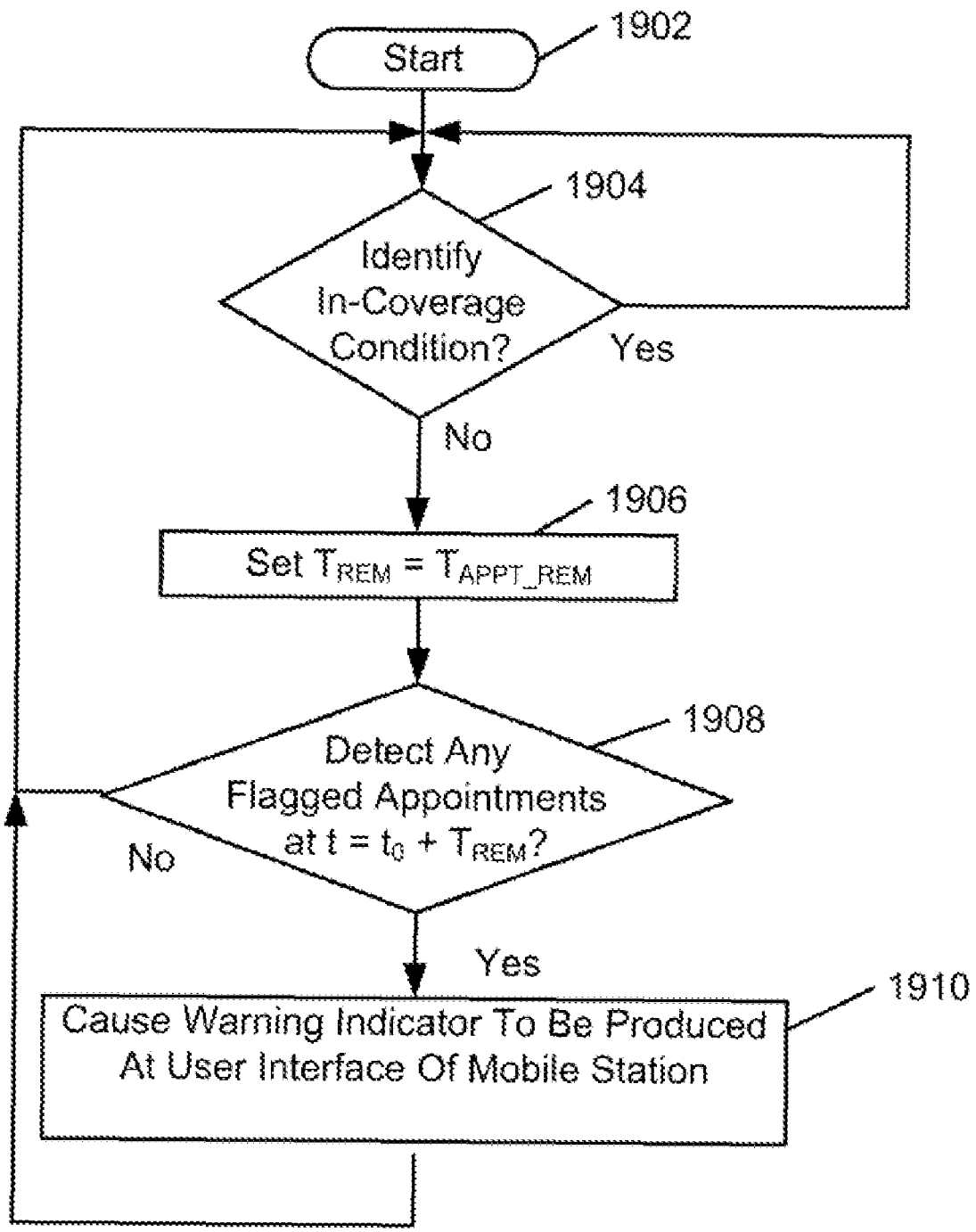
FIG. 19 is a flowchart which describes a method for causing a user interface warning indication to be displayed during out-of-coverage conditions for appointments stored in memory of the mobile station of FIGS. 1-3.
Figure 20:
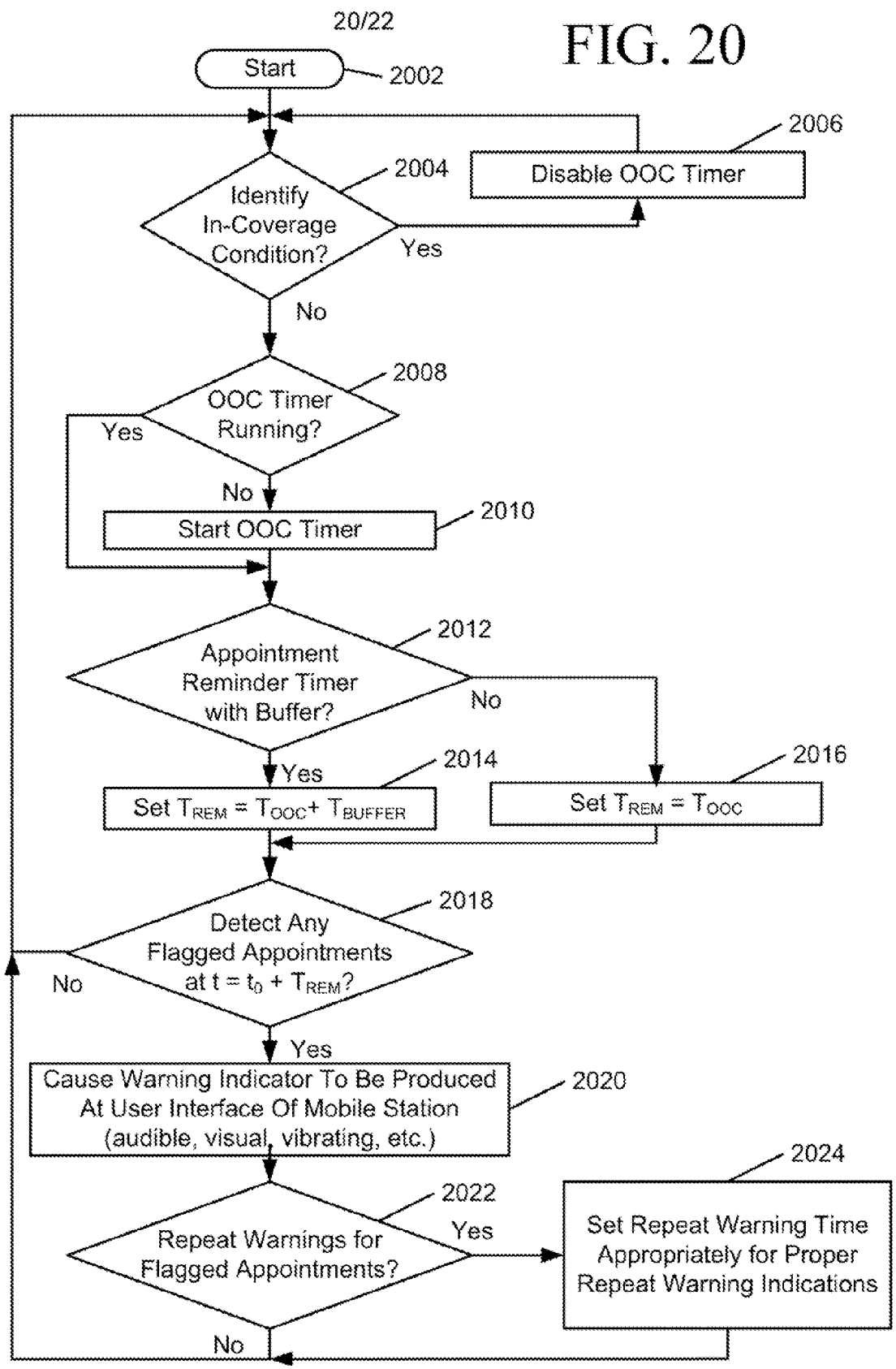
FIG. 20 is a flowchart which describes a particular implementation of the method of FIG. 13 for causing a user interface warning indication to be displayed during out-of-coverage conditions for appointments stored in memory of the mobile station of FIGS. 1-3, with inclusion of a timer which is initialized during out-of-coverage conditions.

Techniques of the present disclosure described in relation to FIGS. 13-21 help alleviate the aforementioned problems. In particular, FIGS. 13, 19, and 20 are flowcharts which describe such techniques and FIGS. 14-18 and 21 are illustrations of displayed information of the mobile station associated with the techniques.

To begin, FIG. 13 is a flowchart for describing a method for indicating whether wireless coverage is required for a new appointment of a calendar application to be stored in memory of a mobile station. The method may be performed with use of the mobile station (e.g. its one or more processors, such as a microprocessor) operating in the wireless communication network as described in relation to FIGS. 1-4. A computer program product for the mobile station may include computer instructions stored on a storage medium (memory, a floppy disk or CD-ROM) which are written in accordance with the described logic of this method.

Figure 14:
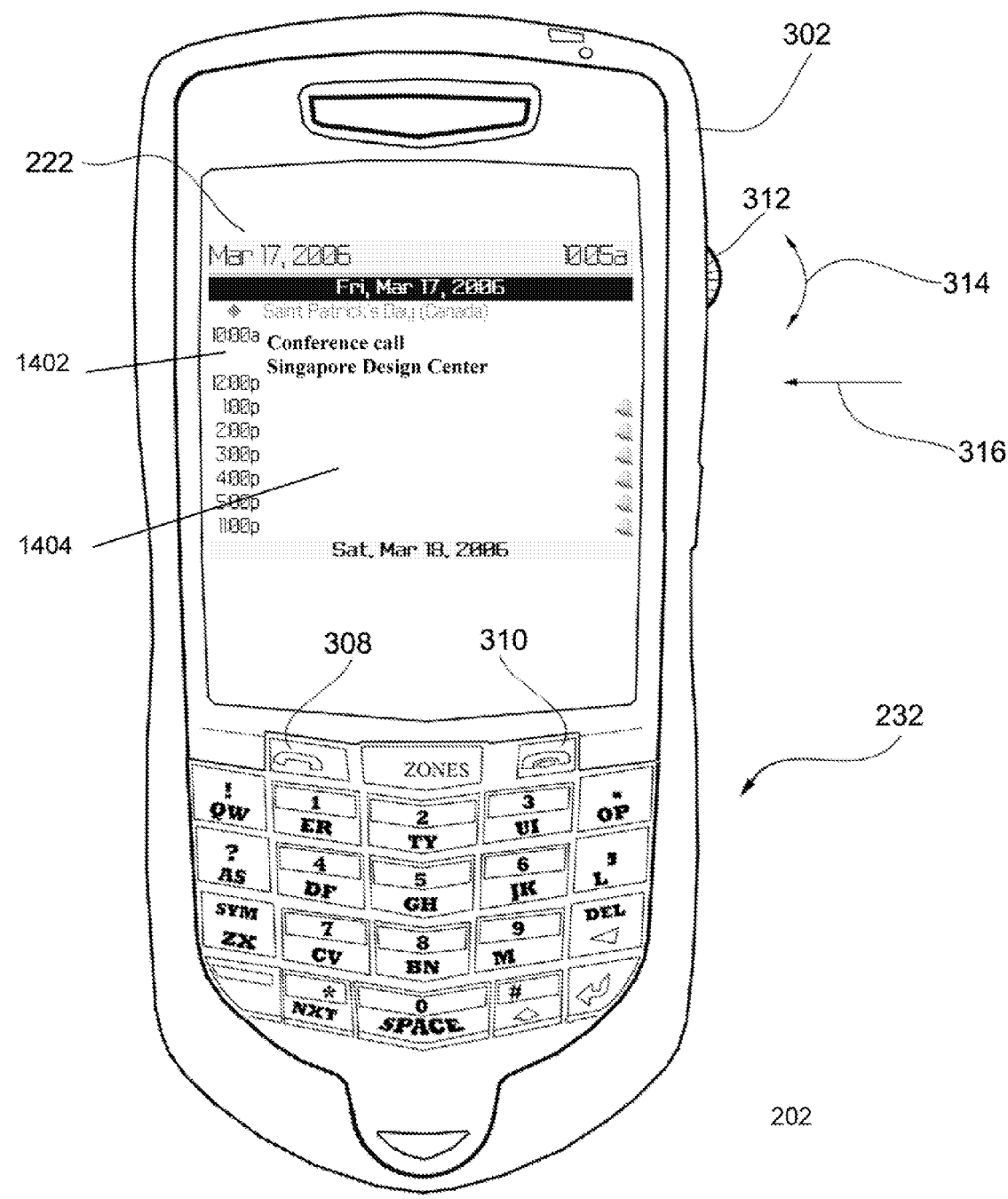
FIG. 14 is an illustration of the mobile station of FIGS. 1-3, where the visual display is displaying a daily calendar listing of a calendar application.

In combination with the flowchart of FIG. 13, reference will be made to the visual illustrations of the mobile station in FIGS. 14-18. Beginning at a start block 1302 of FIG. 13, the processor of the mobile station regularly monitors to identify any new appointment within mobile station 202 (step 1304 of FIG. 13). Appointments may be calendar appointments or task items which include calendar or scheduling information, such as date and/or time of day, as examples. The mobile station may receive a new appointment while interfacing with a separate calendar/scheduling software application, such as Microsoft Outlook® or like software program, which may be operating on a separate computer system, such as a PC or computer network. The mobile station may receive new appointments while wirelessly (e.g. data-synchronized) or directly coupled to a PC or computer network that is hosting the calendar or scheduling software application. Additionally or alternatively, a user may use keypad 232 of FIG. 4 or a similar user interface to manually enter a new appointment into mobile station memory. One example of a calendar appointment 1402 listed within a daily calendar list 1404 is shown in the illustration of FIG. 14. A detailed view of calendar appointment 1402 is shown in the illustration of FIG. 15.

Once a new appointment is identified, the processor determines if wireless coverage is required for the new appointment (step 1306 of FIG. 13). Detection of wireless coverage requirements for the new appointment may be an automated process which may cause the processor to search within the calendar information for a phone number for the call, key words such as "call", "telephone", "chat session" etc., an Internet address, email address, or user or group names associated with chat groups, or like information that indicates wireless coverage is required. Search techniques may be used to detect alphanumeric strings within the calendar information to indicate whether wireless coverage is required for stored appointments.

Figure 15:
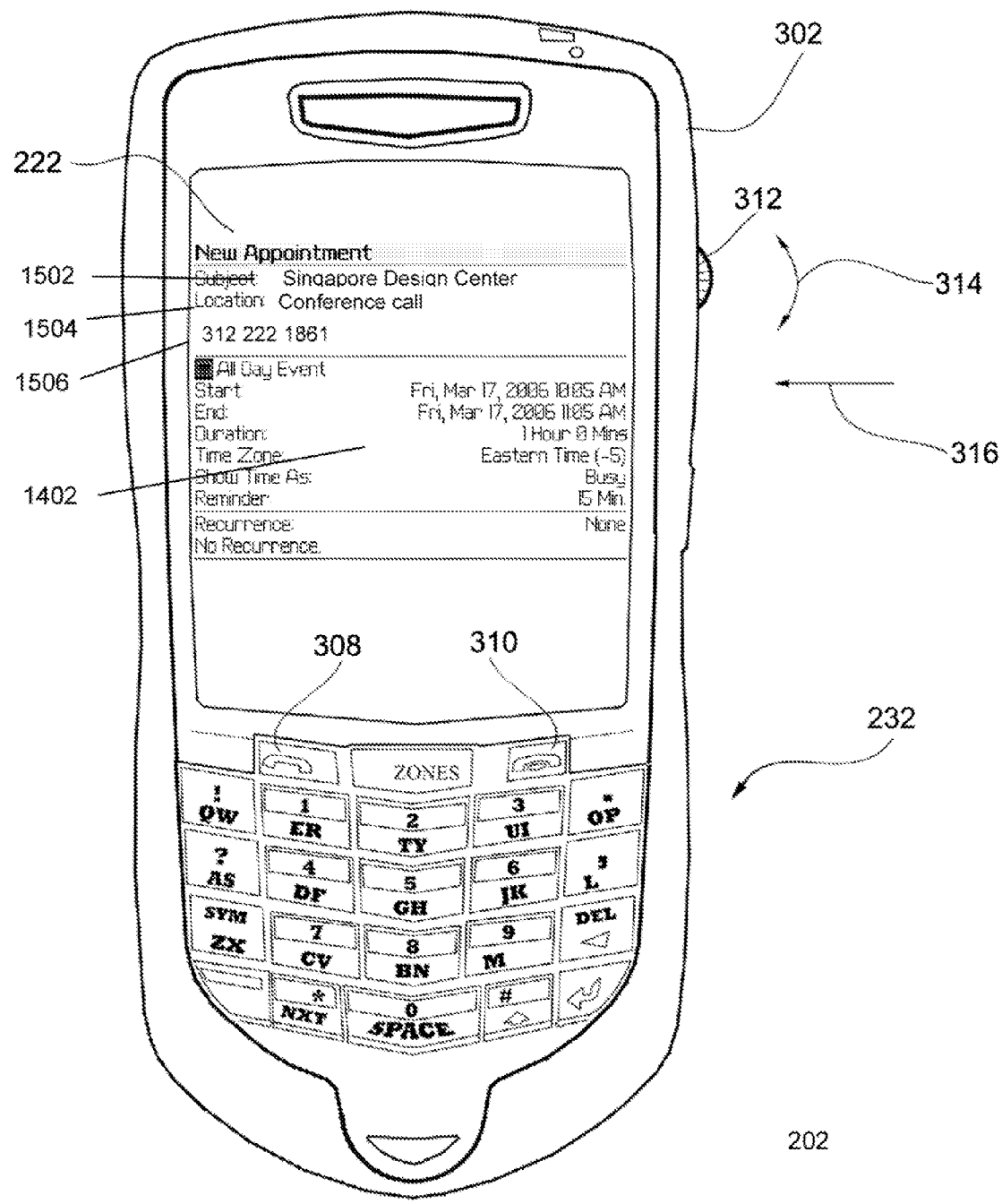
FIG. 15 is an illustration of the mobile station of FIGS. 1-3, where the visual display is displaying a calendar appointment of the calendar application.

Examples of alphanumeric strings indicating wireless coverage required for new appointment 1402 of FIG. 15 are shown within location field 1504 of FIG. 15, with example string "conference call" associated with appointment subject "Singapore Design Center" 1502 of FIG. 15, and within telephone number field 1506 of FIG. 15, where a ten digit number is entered. Similar fields associated with any new appointment may include an Internet address, email address, user or group names associated with chat groups or like information indicating wireless coverage required for the new appointment. In FIG. 18, for example, a task 1804 ("Discuss Marketing Potential") of a task application is shown and associated with a date and time 1802, as well as notes 1806 which indicate that a group chat session for a chat group 1808 ("John's Group").

If any technique described above indicates wireless coverage is required in step 1306, the new appointment will be stored in memory by the processor with an indication of wireless coverage required (step 1308 of FIG. 13). Indication of wireless coverage required may be a programmable flag or variable setting similar to example field "Wireless Coverage Required" 1702 of FIG. 17 associated with the new appointment.

Figure 16:
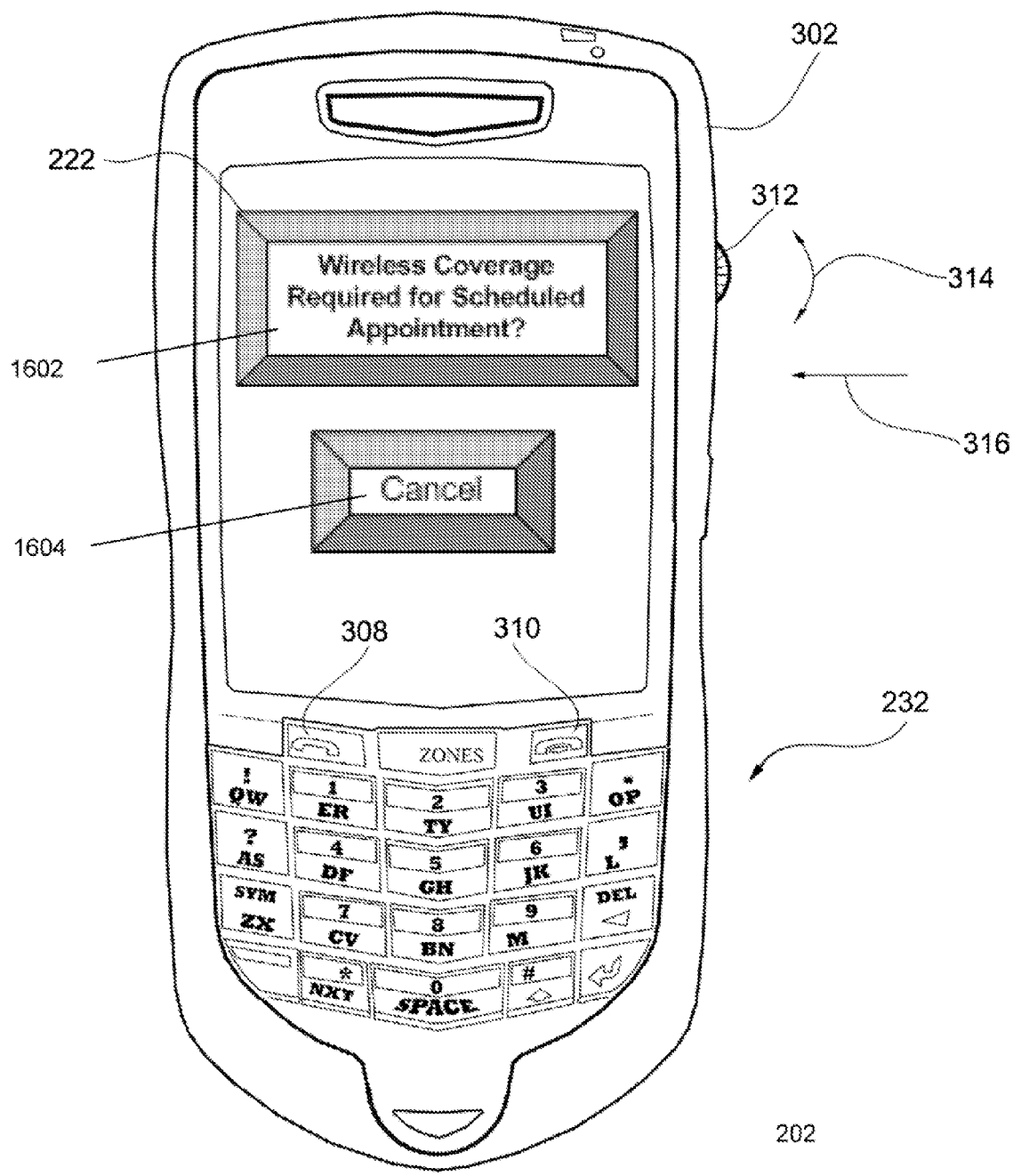
FIG. 16 is an illustration of the mobile station of FIGS. 1-3, where the visual display is displaying a user interface prompt for the user to manually indicate whether wireless coverage is required for the new appointment.
Figure 17:
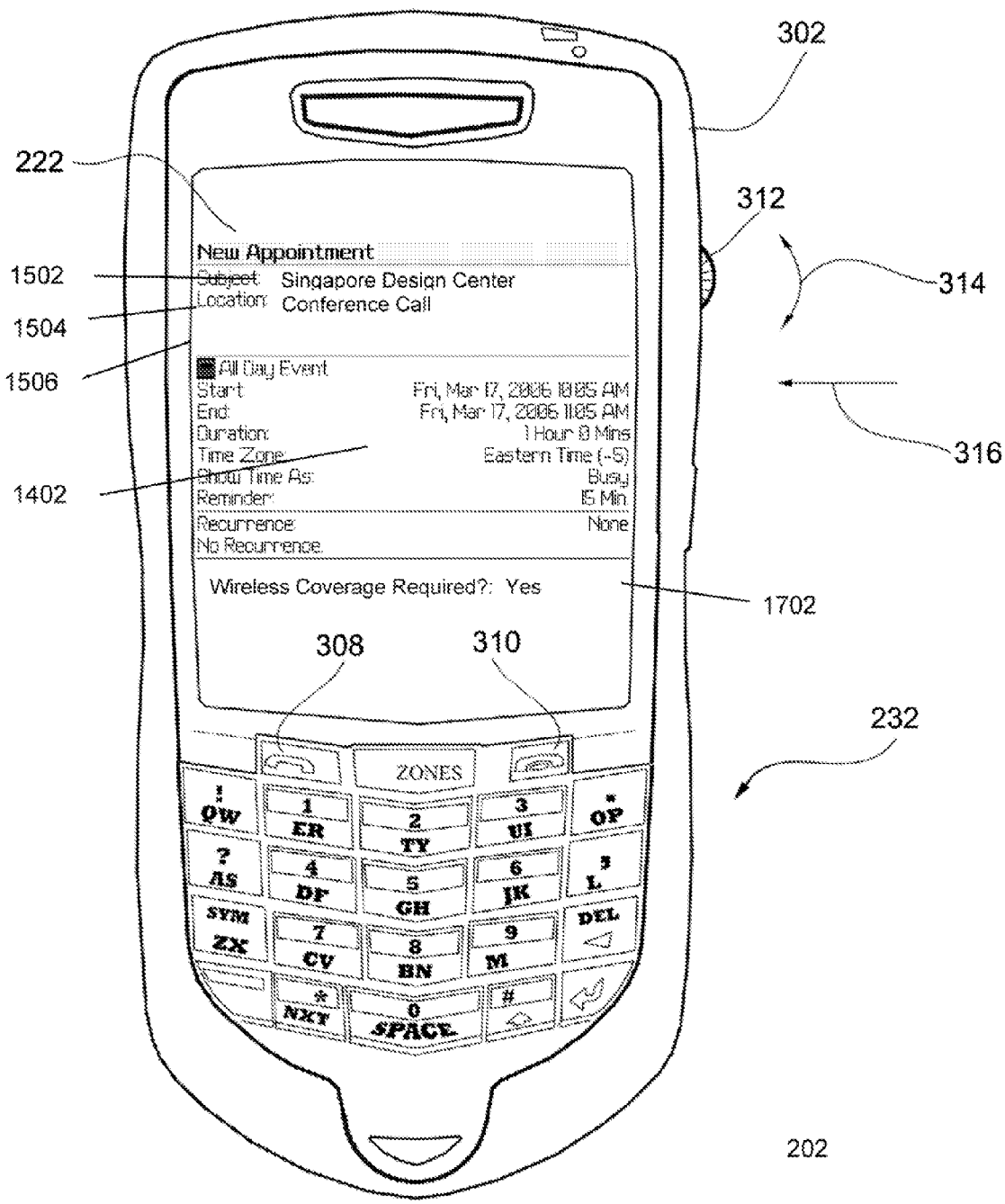
FIG. 17 is an illustration of the mobile station of FIGS. 1-3, where the visual display is displaying the calendar appointment with the inclusion of a "wireless coverage required" field.

In step 1306 if no wireless coverage required is detected within calendar information of the new appointment, the processor may optionally cause an acceptance message prompt 1602 of FIG. 16 ("Wireless Coverage Required for Scheduled Appointment?") and/or cancel prompt 1604 of FIG. 16 ("Cancel") to be displayed in visual display 222 (step 1310 of FIG. 13). This step allows the user to determine and manually set whether wireless coverage is required for the new appointment. For example, the user of the mobile station may use scrollwheel 312 of FIG. 16 (or like key/button of the user interface) to select acceptance message prompt 1602 to indicate that wireless coverage is required for new appointment 1402, or select cancel prompt 1604 to indicate that wireless coverage is not required for new appointment 1402. If acceptance message prompt 1602 is selected by the user as detected by the processor (step 1312 of FIG. 13), the new appointment will be stored in memory of the mobile station with an indication of wireless coverage required (step 1308 of FIG. 13). If cancel prompt 1604 is accepted as detected by the processor in step 1312, the new appointment will be stored in memory of the mobile station with an indication of no wireless coverage required (step 1314 of FIG. 13). As alternatives, wireless coverage required may be accepted by the user's selection of a mobile station key designated as "OK" button, or denied by choosing a mobile station key designated as "CANCEL" button on keypad 232 of FIG. 16. Once the new appointment is stored in memory in step 1308 or step 1314, the process of FIG. 13 returns to step 1304 to monitor for any new appointments. As stated above, the process of FIG. 13 may apply to calendar appointments, task items, or like information associated with anticipated date and times of an upcoming event.

FIG. 19 is a flowchart for describing a method for causing a user interface warning indication to be produced during out-of-coverage conditions for appointments stored in memory of a mobile station. Such warning indications may be produced when wireless coverage is required for such appointments as determined in relation to the process of FIG. 13 previously described. The method may be performed with use of the mobile station (e.g. its one or more processors, such as a microprocessor) operating in the wireless communication network as described in relation to FIGS. 1-4. A computer program product for the mobile station may include computer instructions stored on a storage medium (memory, a floppy disk or CD-ROM) which are written in accordance with the described logic of this method.

Beginning at a start block 1902 of FIG. 19, the processor of the mobile station is operative to identify if the mobile station is operating in-coverage with any suitable wireless communication network (step 1904 of FIG. 19). During an in-coverage condition, radio frequency (RF) communication signals of sufficient strength and quality are being communicated between the mobile station and a wireless communication network. If the in-coverage condition is identified in step 1904, then such monitoring continues and the process will repeat at step 1904. If an in-coverage condition is not identified in step 1904, then the mobile station is experiencing an out-of-coverage condition and prepares to provide a warning if any upcoming appointments requiring wireless coverage are anticipated. An out-of-coverage condition exists when RF communication signals between the mobile station and any suitable wireless communication network are not sufficient for communications.

A time value $T_{REM}$ for appointment/warning may be set equal to a pre-defined time value $T_{APPT\_REM}$ associated with the appointment information (step 1906 of FIG. 19). The time value $T_{REM}$ is a process variable representing a predetermined time period within the date and time of upcoming calendar appointments, task items or other meetings stored in memory of the mobile station. Preferably, $T_{REM}$ is a value between 30 seconds and 10 minutes. Time value $T_{APPT\_REM}$ may comprise appointment information reminder time values, such as a Microsoft Outlook® appointment default reminder time value of fifteen minutes or a task item reminder time value.

As previously described in the flowchart of FIG. 13, an appointment or task may be associated with a stored flag or other indicator to indicate that wireless coverage is required for the appointment. If any flagged calendar appointment, task item, or other meeting item stored in memory is scheduled for a time t equal to current time to plus time value $T_{REM}$ (step 1908 of FIG. 19), the processor may cause a warning message to be produced at the user interface of the mobile station (step 1910 of FIG. 19). If no scheduled items require wireless coverage at a time t equal to the current time to plus time value $T_{REM}$ in step 1908, the process just returns to step 1904. In this case, the warning is refrained from being output from the user interface of the mobile station.

The warning message of step 1910 may generally indicate that wireless coverage is required for the upcoming scheduled item, that the mobile station is out-of-coverage, and/or provide an instruction for the user to relocate the mobile station for removing the out-of-coverage condition. The warning indication may be a visual message displayed on visual display 222, an audible indication produced at speaker 234, other sensory indication such as a vibrating mechanism, or combination of indications within the mobile station. Preferably, the warning message is or includes a visually-displayed text message which instructs the user to relocate the mobile station for removing the out-of-coverage condition. An example of a visual warning message 2102 is shown displayed on visual display 222 of FIG. 21.

Note that such warning indication may be provided at the same time, or a different time, than the actual calendar reminder indication otherwise provided by the calendar application. Note also that such warning indication is provided in addition to any conventional indication for out-of-coverage (e.g. signal strength bar or bars indicating low or non-existent, or text indicating "No Service").

FIG. 20 is a flowchart for describing a particular detailed implementation of the method of FIGS. 13 and 19 for causing a user interface warning indication during out-of-coverage conditions for appointments, with inclusion of a timer which is initialized during out-of-coverage conditions. The method may be performed with use of the mobile station (e.g. its one or more processors such as a microprocessor) operating in the wireless communication network as described in relation to FIGS. 1-4. A computer program product for the mobile station may include computer instructions stored on a storage medium (memory, a floppy disk or CD-ROM) which are written in accordance with the described logic of this method.

In general, the process described in the flowchart of FIG. 20 utilizes a timer to determine a duration for which the mobile station is continuously out-of-coverage from any suitable wireless communication network. The timer is described in the flowchart of FIG. 20 as an out-of-coverage (OOC) timer which is used in a mobile station to determine a time to initiate user interface warning indications for upcoming scheduled appointments requiring wireless service.

Beginning at a start block 2002 of FIG. 20, the processor of the mobile station is operative to identify if mobile station 202 is operating in-coverage with any suitable wireless communication network (step 2004 of FIG. 20). During an in-coverage condition, radio frequency (RF) communication signals of sufficient strength and quality are being communicated between the mobile station and a wireless communication network. If the in-coverage condition is identified in step 2004, an out-of-coverage (OOC) timer will be disabled (step 2006 of FIG. 20) and the processor continues monitoring at step 2004. If an in-coverage condition is not identified in step 2004, then an out-of-coverage condition exists where RF communication signals between the mobile station and any suitable wireless communication network are not sufficient for communications. If an in-coverage condition is not identified in step 2004, and if the OOC timer is not currently running (as identified by the processor in step 2008 of FIG. 20), the processor causes the OOC timer to be initialized and started (step 2010 of FIG. 20). If the OOC timer is currently running as identified in step 2208, the process advances to step 2012.

Next, if a buffer time is available to be added to the appointment reminder time (as identified in step 2012 of FIG. 20), a variable time value $T_{REM}$ may be set to equal a sum of a time value $T_{OCC}$ (i.e. for the OCC timer) plus a buffer time value $T_{BUFFER}$ (step 2014 of FIG. 20). Preferably, the buffer time is an optional user or manufacturer programmable value for providing an additional time of warning indications for upcoming appointments requiring wireless service. If the user or manufacturer has chosen to not include a buffer time to be added to the appointment reminder time in step 2012, the variable time value $T_{REM}$ may be set to equal OOC timer time value $T_{OCC}$ (step 2016 of FIG. 20).

Figure 21:
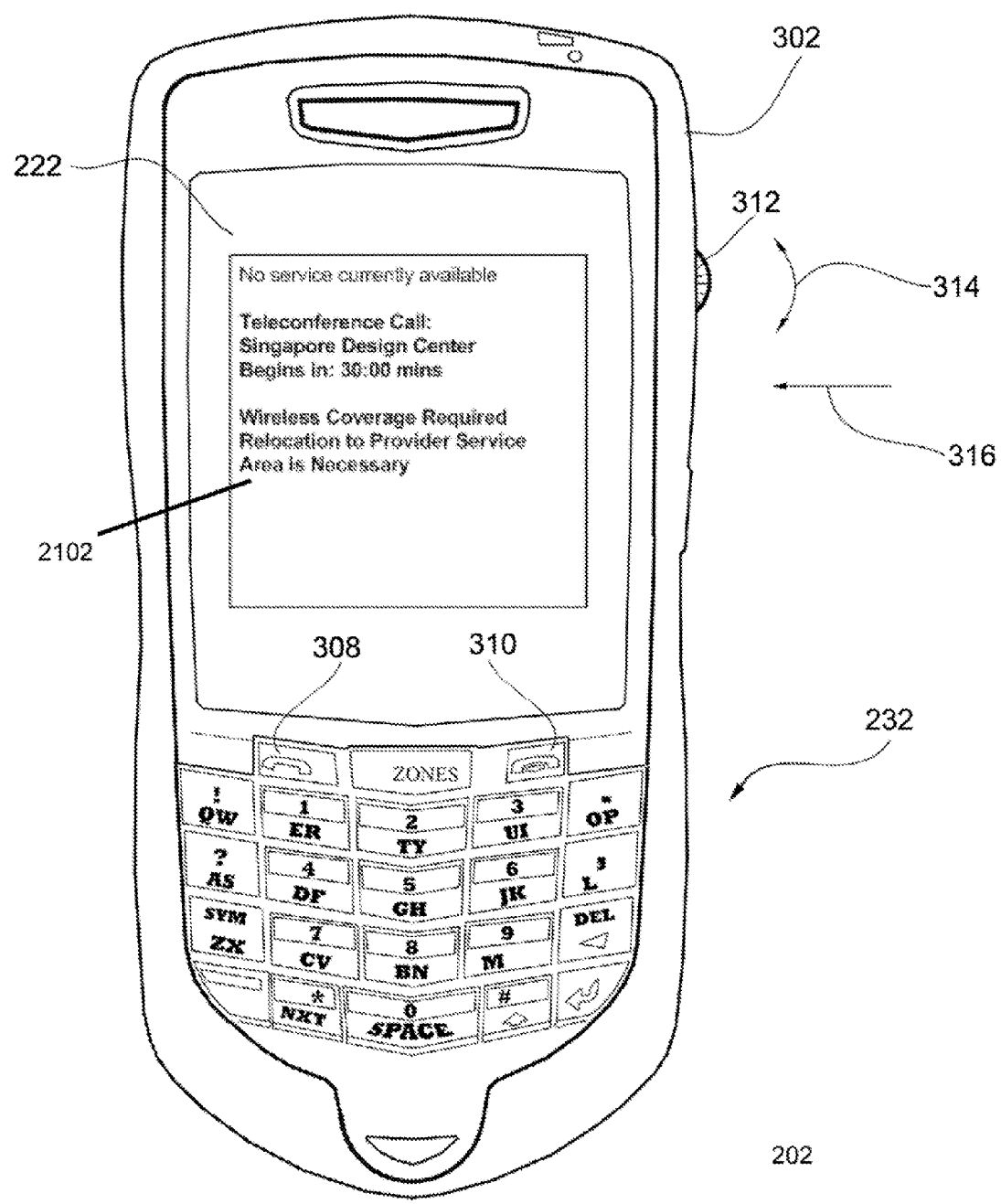
FIG. 21 is an illustration of the mobile station of FIGS. 1-3, where the visual display is displaying a warning for an upcoming appointment requiring wireless coverage when an out-of-coverage condition is present.

Once $T_{REM}$ is set to a usable value, the processor determines if any appointments requiring wireless service are scheduled for a time t equal to a sum of the current time $t_0$ plus $T_{REM}$ (step 2018 of FIG. 20). For any appointments requiring wireless service scheduled at time t, a warning indication may be produced at the user interface of the mobile station (step 2020 of FIG. 20). The warning indication may be in the form of a visual message displayed on visual display 222, an audible warning indication at speaker 234, a combination of warning indications or other such user interface warning indication, as described earlier above. An example warning message 2102 of FIG. 21 is shown displayed on visual display 222 of FIG. 21. Note that such warning indication may be provided at the same time, or a different time, than the actual calendar reminder indication otherwise provided by the calendar application. Note also that such warning indication is provided in addition to any conventional indication for out-of-coverage (e.g. signal strength bar or bars indicating low or non-existent, or text indicating "No Service").

Following the warning indication of any appointment requiring wireless service, the processor may determine if the appointment information should be repeated at predetermined time intervals (step 2022 of FIG. 20). If repeat warning messages are indicated for any appointment requiring wireless service, a reminder time associated with each repeat warning message will be set appropriately for each appointment requiring wireless service (step 2024 of FIG. 20). The processor then returns to step 2004 to continue the process.

Advantageously, with the techniques of FIGS. 13-20, the user of the mobile station is made aware of RF coverage problems well before the time of the scheduled appointment, which helps prevent the user from missing or being late for the appointment.

A related problem is associated with scanning techniques of a mobile station when voice calls are anticipated. As described earlier, calendar appointments are stored in memory of the mobile station and are typically associated with calendar information which includes a date, time, and/or time period of the appointment. The calendar appointment may or may not be for an anticipated scheduled voice call (e.g. a conference call) utilizing the mobile station. If the calendar appointment is for such a scheduled call, wireless coverage is required for the mobile station. That is, at the date and time of the appointment, the mobile station must be located within RF coverage range of the wireless communication network to make or receive the call for the appointment. If not, the user may miss or be late for the scheduled call. When the mobile station initially goes out-of-coverage, the mobile station performs scanning operations at a relatively fast scan rate in attempt to identify any available wireless networks within RF coverage range. Over time, however, when no networks are found, the scan rate is decreased to a relatively slow scan rate. This is done in order to reduce power consumption of the mobile station, as scanning operations consume a significant amount of battery power. Currently, however, scanning operations and scan rates are functionally disconnected from stored calendar appointments which may be for voice calls or otherwise require wireless service for the mobile station.

Figure 22:
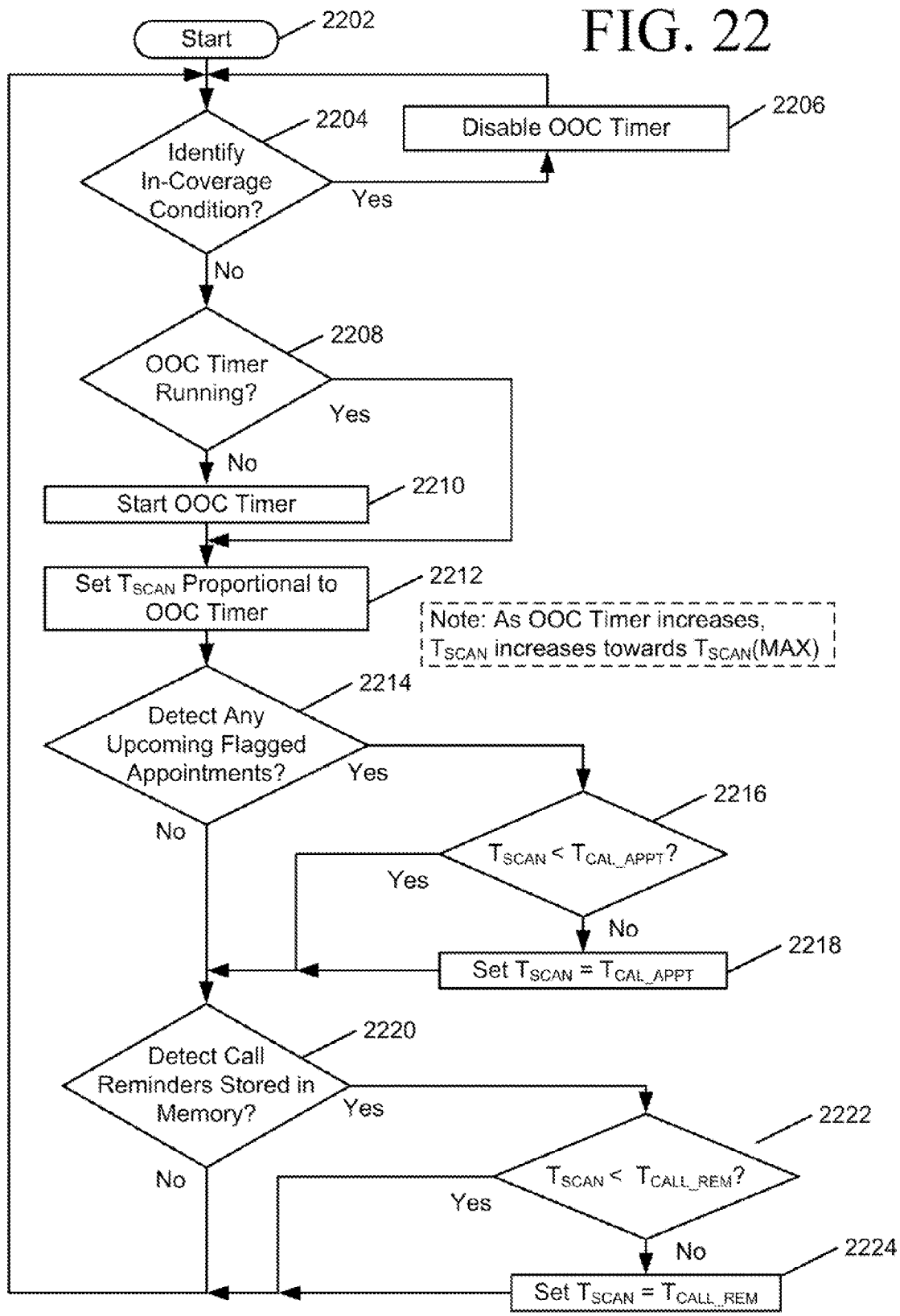
FIG. 22 is a flowchart which describes a method for varying a scan delay value dependent on upcoming appointments and stored call reminders requiring wireless service for the mobile station of FIGS. 1-3.

Techniques of the present disclosure described in relation to FIG. 22 help alleviate the aforementioned problems. Generally, scanning operations of the present disclosure take into account any upcoming or imminent calendar appointments or call reminders stored in memory. FIG. 22 is a flowchart for describing a method for varying a scan delay value during out-of-coverage conditions dependent on upcoming appointments, tasks and stored call reminders requiring wireless service for a mobile station. The method may be performed with use of the mobile station (e.g. its one or more processors such as a microprocessor) operating in the wireless communication network as described in relation to FIGS. 1-4. A computer program product for the mobile station may include computer instructions stored on a storage medium (memory, a floppy disk or CD-ROM) which are written in accordance with the described logic of this method.

In general, the one or more processors of the mobile station are operative to identify whether a call appointment or reminder for a communication session to be established during a current time period is stored in the memory, and determine a scan rate for scanning operations of the wireless transceiver which varies based on whether the call appointment or reminder for the communication session to be established during the current time period is identified. If the call appointment or reminder for the communication session to be established during the current time period is identified, for example, then the scan rate may be determined to be a first scan rate; otherwise the scan rate may be determined to be a second scan rate that is less than the first rate. The scan rate may further be determined to vary based on a duration of time over which repeated scanning operations fail to identify a suitable wireless communication network for communication (e.g. as the duration of time increases, the scan rate decreases). More generally, then, scanning operations and/or the scan rate of the present disclosure is determined based on different items which include any stored upcoming appointments requiring wireless service, previous call attempts or call reminders, as well as the time period over which scanning has been unsuccessful. In a simpler embodiment, a scanning operation is triggered based on identifying an imminent appointment or reminder regardless of the existing scan rate which is otherwise left unchanged. Advantageously, the scanning procedure is performed so as to reduce power consumption in the mobile communication device without compromising calling ability.

Beginning at a start block 2202 of FIG. 22, the processor of the mobile station is operative to identify if the mobile station is operating in-coverage with any suitable wireless communication network (step 2204 of FIG. 22). During an in-coverage condition, radio frequency (RF) communication signals of sufficient strength and quality are being communicated between the mobile station and a wireless communication network. If the in-coverage condition is identified in step 2204, an out-of-coverage (OOC) timer will be disabled (step 2206 of FIG. 22) and the process will repeat step 2204. The OOC timer is utilized to determine a duration for which the mobile station is continuously out-of-coverage from any suitable wireless communication network. If an in-coverage condition is not identified in step 2204, then an out-of-coverage condition exists where RF communication signals between the mobile station and any suitable wireless communication network are not sufficient for communications. If an in-coverage condition is not identified in step 2204, and if the OOC timer is not currently running (as identified in step 2208 of FIG. 22), the processor causes the OOC timer to be initialized and started (step 2210 of FIG. 22). If the OOC timer is currently running, the process advances to step 2212.

Next in step 2212, a variable time value $T_{SCAN}$ is initially set to equal a time value proportional to the amount of time since the out-of-coverage condition has been detected, based on the present value of the OOC timer (step 2212 of FIG. 22). The initial value of $T_{SCAN}$ may be determined by the present value of the OOC timer using conventional techniques. This variable time value $T_{SCAN}$ represents a scan delay value that will determine a scan rate for scanning or monitoring usable RF spectrum for wireless networks within range of the mobile station. An action of monitoring usable RF spectrum for wireless networks may be referred to as a system scan. As described, the scan delay value may be set proportional to the time period since the most recent out-of-coverage condition was detected. The scan delay value will increase proportionally as the OOC timer time value increases to reduce system scan rate in an established out-of-coverage environment in order to reduce power consumption on the mobile station battery. Put another way, the scan rate is initially determined to vary based on a predefined relationship with the OOC time value such that, as the OOC time value increases, the scan rate decreases. When the system scan is not active, transmitter and receiver circuitry is disabled in large part, and is not draining any significant current from the battery of the mobile station. Therefore, an increased scan delay value reduces the battery power consumption in the mobile device, and therefore increases the battery life. The scan delay value may have a predefined upper limit defined as a maximum scan delay value and a predefined lower limit defined as a minimum scan delay value.

Next, the processor determines if any upcoming appointments or tasks require wireless coverage (step 2214 of FIG. 22). If any upcoming or imminent appointments or tasks requiring wireless coverage are detected, then the scan rate will be adjusted or varied (i.e. decreased) based on this knowledge. The scan rate may be varied based on a predetermined relationship with the number of call appointments such that, as the number of call appointments increase, the scan rate increases. In this implementation, the processor performs a test to compare $T_{SCAN}$ to a process variable time value $T_{CAL\_APPT}$ (step 2216 of FIG. 22). The process variable time value $T_{CAL\_APPT}$ may be a function of a variable time value, such as $T_{SCAN}$ or a predefined constant. For example, the value may be a maximum scan delay value $T_{SCAN}(MAX)$ and number of calendar appointments requiring wireless coverage and/or amount of time before a calendar appointment requiring wireless coverage. One example for determining the value of $T_{CAL\_APPT}$ may involve a variable time value such as $T_{SCAN}$ divided by a predefined constant or variable value. $T_{CAL\_APPT}$ may also be determined by a function including one or more of a number of upcoming appointments requiring wireless service, amount of time before upcoming appointments requiring wireless service, or other constant or variable value that properly suits the application. If $T_{SCAN}$ is less than $T_{CAL\_APPT}$ in step 2216, then no change occurs to the time value $T_{SCAN}$. If $T_{SCAN}$ is greater than $T_{CAL\_APPT}$, then $T_{SCAN}$ will be set to equal $T_{CAL\_APPT}$ (step 2218 of FIG. 22).

Next, the processor detects if any call reminders are stored in memory of the mobile station (step 2220 of FIG. 22). If no stored call reminders are detected, the method returns to step 2204 to repeat the process. If stored call reminders are detected in step 2220, then the scan rate will be adjusted or varied (i.e. decreased) based on this knowledge. The scan rate may be varied based on a predetermined relationship with the number of call reminders such that, as the number of call reminders increase, the scan rate increases. In this implementation, a test will be performed to determine if $T_{SCAN}$ is less than a process variable time value $T_{CALL\_REM}$ (step 2222 of FIG. 22). Similar to the process described above for setting $T_{SCAN}$ to a lower value if any appointment reminders are detected, $T_{SCAN}$ may be reduced by a predetermined value if any stored call reminders are detected. The process variable time value $T_{CALL\_REM}$ may be a function of a variable time value such as $T_{SCAN}$ or a predefined constant such as maximum scan delay value and number of stored call reminders. One example for determining the value of $T_{CALL\_REM}$ may involve a variable time value, such as $T_{SCAN}$ divided by a predefined constant or variable value. $T_{CALL\_REM}$ may also be determined by a function including one or more of a number of stored call reminders or other constant or variable value that properly suits the application. If $T_{SCAN}$ is less than $T_{CALL\_REM}$ in step 2222, then no change occurs to the time value $T_{SCAN}$. If $T_{SCAN}$ is greater than $T_{CALL\_REM}$, then $T_{SCAN}$ will be set to equal $T_{CALL\_REM}$ (step 2224 of FIG. 22). Preferably, $T_{SCAN}$ may be determined as a function of both the number of upcoming appointments requiring wireless coverage and the number of stored call reminders. Next, the process returns to step 2204 to repeat the process.

Once determined, the scan delay value may be loaded into a scan timer and the scan timer is set to run until expiration. After the scan timer has expired, a system scan for wireless networks may be performed by the mobile station. Thus, each time the scanning operation fails to identify a suitable wireless communication network for communication, the scan delay timer is set with the scan delay value and is set to run, where the scanning operation is repeated upon expiration of the scan delay timer.

Note that the techniques for determining which time value is lesser in the above steps will continuously provide a scan delay time having the least value. In some applications, a greater scan delay time value may be desired, and may be accomplished by modifying decision blocks 2216 and 2218 and their associated process blocks. In a simpler embodiment related to FIG. 22, a scanning operation is triggered based on identifying an imminent appointment (e.g. within 30 seconds to 5 minutes) or reminder regardless of the existing scan rate, which is otherwise left unchanged and set based on the length of time of the out-of-coverage condition.

Thus, user interface methods and apparatus for processing voice call requests based on communication conditions of a mobile communication device have been described. The mobile communication device of the present disclosure includes one or more processors, a wireless transceiver coupled to the one or more processors, and a user interface which includes a visual display. In one illustrative embodiment, a voice call request for a voice call is received through the user interface. If the voice call request is received during an out-of-coverage condition of the mobile communication device, the processor causes a call denial indication to be displayed in the visual display, which indicates that the voice call request could not be completed. The processor also causes a call reminder setup prompt to be displayed, which may be accepted or declined through the user interface. If an acceptance of the call reminder setup prompt is received, the processor causes a call reminder prompt for reattempting the voice call request to be displayed when an in-coverage condition of the mobile communication device is subsequently identified. The call reminder prompt, which may be accepted or declined through the user interface, reveals various call information regarding the previous voice call request such as the telephone number, name, and time of the previous request. If the call reminder prompt is accepted, the processor causes a voice call associated with the voice call request to be initiated. Additional call reminder techniques are disclosed to provide an even more flexible and easy-to-use interface.

In addition, alert methods and apparatus for call appointments in a calendar application based on communication conditions of a mobile communication device have been described. Calendar information for an appointment in the calendar application is received and stored in memory. The calendar information is associated with a date and time of the appointment. In response to identifying an out-of-coverage condition of the mobile communication device within a predetermined time period of the date and time of the appointment, a warning indication is produced at a user interface of the mobile communication device. The warning indication may be or include a message which instructs a user of the mobile communication device to relocate the mobile communication device for removing the out-of-coverage condition, and may also include an audible or vibrating alert. The warning indication may be provided only if wireless coverage is required for the appointment, where a telephone number or other suitable call information is identified within the calendar information.

Finally, methods and apparatus for use in controlling scanning operations or a scan rate based on call appointments or reminders have been described. In one illustrative example, one or more processors of a mobile communication device may be operative to identify whether a call appointment or reminder for a communication session to be established during a current time period is stored in the memory, and determine a scan rate for scanning operations of the wireless transceiver which varies based on whether the call appointment or reminder for the communication session to be established during the current time period is identified. If the call appointment or reminder for the communication session to be established during the current time period is identified, for example, then the scan rate may be determined to be a first scan rate; otherwise the scan rate may be determined to be a second scan rate that is less than the first rate. The scan rate may further be determined to vary based on a duration of time over which repeated scanning operations fail to identify a suitable wireless communication network for communication (e.g. as the duration of time increases, the scan rate decreases). More generally, then, scanning operations and/or the scan rate of the present disclosure is determined based on different items which include any stored upcoming appointments requiring wireless service, previous call attempts or call reminders, as well as the time period over which scanning has been unsuccessful. In a simpler embodiment, a scanning operation is triggered based on identifying an imminent appointment or reminder regardless of the existing scan rate which is otherwise left unchanged. Advantageously, the scanning procedure is performed so as to reduce power consumption in the mobile communication device without compromising calling ability.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method in a mobile communication device of processing calendar information, the method comprising the acts of:
   receiving and storing calendar information for an appointment in a calendar application of the mobile communication device, the calendar information indicating a date and time of the appointment;
   identifying whether the calendar information includes call appointment information for the appointment which comprises a call appointment with use of the mobile communication device;
   identifying, at the mobile communication device, whether a radio frequency (RF) out-of-coverage condition exists between the mobile communication device and a wireless communication network within a predetermined time period from the date and time of the appointment;
   if the RF out-of-coverage condition is identified within the predetermined time period and the call appointment information is identified to be included in the calendar information: causing an RF out-of-coverage warning indication to be produced in association with the appointment at a user interface of the mobile communication device;
   if the RF out-of-coverage condition is identified within the predetermined time period but the call appointment information is not identified to be included in the calendar information: refraining from causing the RF out-of-coverage warning indication to be produced in association with the appointment at the user interface; and
   at the date and time of the appointment: causing a calendar reminder indication for the appointment to be produced at the user interface as a reminder of the appointment.

2. The method of claim 1, further comprising:
   refraining from causing the RF out-of-coverage warning indication to be produced at the user interface if the RF out-of-coverage condition is not identified within the predetermined time period from the date and time of the appointment.

3. The method of claim 1, wherein the RF out-of-coverage warning indication comprises a message which instructs a user of the mobile communication device to relocate the mobile communication device for removing the out-of-coverage condition.

4. The method of claim 1, wherein the RF out-of-coverage warning indication includes an audible or vibrating alert.

5. The method of claim 1,
   which is performed by computer instructions stored in memory of the mobile communication device and executed on a processor of the mobile communication device.

6. The method of claim 1, further comprising:
   wherein the act of identifying whether the calendar information includes the call appointment information for the appointment comprises the further act of identifying whether the calendar information includes a telephone number for the appointment.

7. The method of claim 1, wherein the act of producing the RF out-of-coverage warning indication comprises the further act of producing the RF out-of-coverage warning indication in a display of the mobile communication device.

8. A mobile communication device, comprising:
   one or more processors;
   memory accessible by the one or more processors;
   a wireless transceiver coupled to the one or more processors;
   a user interface which includes a visual display and a plurality of keys;
   the one or more processors being operative to:
      receive and store calendar information for an appointment in a calendar application stored in the memory, the calendar information indicating a date and time of the appointment;
      identify whether the calendar information includes call appointment information for the appointment which comprises a call appointment with use of the mobile communication device;
      identify whether a radio frequency (RF) out-of-coverage condition exists between the mobile communication device and a wireless communication network within a predetermined time period from the date and time of the appointment;
      if the RF out-of-coverage condition is identified within the predetermined time period and the call appointment information is identified to be included in the calendar information: cause an RF out-of-coverage warning indication to be produced in association with the appointment at the user interface;
      if the RF out-of-coverage condition is identified within the predetermined time period but the call appointment information is not identified to be included in the calendar information: refrain from causing the RF out-of-coverage warning indication to be produced in association with the appointment at the user interface; and
      at the date and time of the appointment: cause a calendar reminder indication for the appointment to be produced at the user interface as a reminder of the appointment.

9. The mobile communication device of claim 8, where the one or more processors are further operative to:
   refrain from causing the RF out-of-coverage warning indication to be produced at the user interface if the RF out-of-coverage condition is not identified within the predetermined time period from the date and time of the appointment.

10. The mobile communication device of claim 8, wherein the RF out-of-coverage warning indication comprises a message which instructs a user of the mobile communication device to relocate the mobile communication device for removing the RF out-of-coverage condition.

11. The mobile communication device of claim 8, further comprising:
the user interface further comprising at least one of an audible alert mechanism and a vibrating alert mechanism; and
wherein the RF out-of-coverage warning indication includes at least one of an audible alert via the audible alert mechanism and a vibrating alert via the vibrating alert mechanism.

12. The mobile communication device of claim 8, wherein the one or more processors are further operative to identify whether the calendar information includes call appointment information for the appointment by identifying whether the calendar information includes
an indication that wireless coverage is required for the mobile communication device for the call appointment.

13. The mobile communication device of claim 8, wherein the one or more processors are further operative to identify whether the calendar information includes call appointment information for the appointment by identifying whether the calendar information includes a telephone number for the appointment.

14. The mobile communication device of claim 8, wherein the one or more processors are operative to produce the RF out-of-coverage warning indication by producing the RF out-of-coverage warning indication in a display of the mobile communication device.

15. A communication system, comprising:
a wireless communication network;
a mobile communication device operative in the wireless communication network;
the mobile communication device including:
one or more processors;
memory accessible by the one or more processors;
a wireless transceiver coupled to the one or more processors;
a user interface which includes a visual display and a plurality of keys;
the one or more processors being operative to:
receive and store calendar information for an appointment in a calendar application stored in the memory, the calendar information indicating a date and time of the appointment;
identify whether the calendar information includes call appointment information for the appointment which comprises a call appointment with use of the mobile communication device;
identify whether a radio frequency (RF) out-of-coverage condition exists between the mobile communication device and the wireless communication network within a predetermined time period from the date and time of the appointment;
if the RF out-of-coverage condition is identified within the predetermined time period and the call appointment information is identified to be included in the calendar information: cause an RF out-of-coverage warning indication to be produced in association with the appointment at the user interface;
if the RF out-of-coverage condition is identified within the predetermined time period but the call appointment information is not identified to be included in the calendar information: refrain from causing the RF out-of-coverage warning indication to be produced in association with the appointment at the user interface; and
at the date and time of the appointment: cause a calendar reminder indication for the appointment to be produced at the user interface as a reminder of the appointment.

16. The communication system of claim 15, where the one or more processors of the mobile communication device are further operative to:
refrain from causing the RF out-of-coverage warning indication to be produced at the user interface if the RF out-of-coverage condition is not identified within the predetermined time period from the date and time of the appointment.

17. The communication system of claim 15, wherein the RF out-of-coverage warning indication comprises a message which instructs a user of the mobile communication device to relocate the mobile communication device for removing the RF out-of-coverage condition.

18. The communication system of claim 15, further comprising:
the user interface of the mobile communication device further comprising at least one of an audible alert mechanism and a vibrating alert mechanism; and
wherein the RF out-of-coverage warning indication includes at least one of an audible alert via the audible alert mechanism and a vibrating alert via the vibrating alert mechanism.

19. The communication system of claim 15, wherein the one or more processors of the mobile communication device are further operative to identify whether the calendar information includes call appointment information for the appointment by identifying whether the calendar information includes
an indication that wireless coverage is required for the mobile communication device for the call appointment.

20. The communication system of claim 15, wherein the one or more processors of the mobile communication device are further operative to identify whether the calendar information includes call appointment information for the appointment by identifying whether the calendar information includes a telephone number for the appointment.

21. The communication system of claim 15, wherein the one or more processors of the mobile communication device are further operative to produce the RF out-of-coverage warning indication by producing the RF out-of-coverage warning indication in a display of the mobile communication device.

* * * * *